United States Patent [19]
Nimura

[11] Patent Number: 5,947,823
[45] Date of Patent: Sep. 7, 1999

[54] THREE-DIMENSIONAL GAME APPARATUS AND IMAGE SYNTHESIZING METHOD

[75] Inventor: Shinobu Nimura, Yokohama, Japan

[73] Assignee: Namco Ltd., Tokyo, Japan

[21] Appl. No.: 08/722,194

[22] PCT Filed: Feb. 15, 1996

[86] PCT No.: PCT/JP96/00328

§ 371 Date: Jan. 9, 1997

§ 102(e) Date: Jan. 9, 1997

[87] PCT Pub. No.: WO96/25211

PCT Pub. Date: Aug. 22, 1996

[30] Foreign Application Priority Data

Feb. 17, 1995 [JP] Japan ................................. 7-053671

[51] Int. Cl.[6] ............................ A63F 9/22; G06F 15/66
[52] U.S. Cl. ................................. 463/32; 463/31; 463/7; 345/426
[58] Field of Search ........................ 463/1, 7–8, 30–34, 463/36; 395/118, 119, 126, 129–132, 173; 364/410; 348/552; 345/112–118, 122, 426, 418, 433, 473

[56] References Cited

U.S. PATENT DOCUMENTS

| | | | |
|---|---|---|---|
| 5,261,041 | 11/1993 | Susman | 345/473 |
| 5,267,734 | 12/1993 | Stamper et al. | 463/44 |
| 5,366,376 | 11/1994 | Copperman et al. | 364/410.1 |
| 5,415,549 | 5/1995 | Logg | 434/307 R |

*Primary Examiner*—Jessica J. Harrison
*Assistant Examiner*—Mark A. Sager
*Attorney, Agent, or Firm*—Oliff & Berridge, PLC

[57] ABSTRACT

There is disclosed a three-dimensional game apparatus which enables a player to sense the passage of time and can give variety to game and demo scenes. The apparatus includes a virtual time computation section (120) for determining a virtual time by computing the passage of time in a virtual three-dimensional space from the actual passage of time in the real space; a virtual three-dimensional space computation section (100) for computing the positional information of an object and the positional information of a moving light source such as sun in the virtual three-dimensional space with the passage of the virtual time; and a three-dimensional computation section (210) for performing three-dimensional computations including a shading computation on the object disposed within the virtual three-dimensional space, based on the positional information of the light source. A depth-cueing computation can be used to present the night darkness and a translucent computation can be used to present the moon disappearing in the sky or the like. If game stages each having a different game setting are used, the virtual time of one game stage starts at the time at which the prior game stage terminates. The virtual time may be passed while the demo scene is being displayed.

29 Claims, 21 Drawing Sheets

| OBJECT NUMBER | POSITIONAL INFORMATION | | | DIRECTIONAL INFORMATION | | |
|---|---|---|---|---|---|---|
| $OB_0$ | $X_0$ | $Y_0$ | $Z_0$ | $\theta_0$ | $\phi_0$ | $\rho_0$ |
| $OB_1$ | $X_1$ | $Y_1$ | $Z_1$ | $\theta_1$ | $\phi_1$ | $\rho_1$ |
| $OB_2$ | $X_2$ | $Y_2$ | $Z_2$ | $\theta_2$ | $\phi_2$ | $\rho_2$ |
| $OB_3$ | $X_3$ | $Y_3$ | $Z_3$ | $\theta_3$ | $\phi_3$ | $\rho_3$ |
| $OB_4$ | $X_4$ | $Y_4$ | $Z_4$ | $\theta_4$ | $\phi_4$ | $\rho_4$ |
| ⋮ | ⋮ | ⋮ | ⋮ | ⋮ | ⋮ | ⋮ |
| $OB_{i-2}$ | $X_{m-2}$ | $Y_{m-2}$ | $Z_{m-2}$ | $\theta_{m-2}$ | $\phi_{m-2}$ | $\rho_{m-2}$ |
| $OB_{i-1}$ | $X_{m-1}$ | $Y_{m-1}$ | $Z_{m-1}$ | $\theta_{m-1}$ | $\phi_{m-1}$ | $\rho_{m-1}$ |
| $OB_i$ | $X_m$ | $Y_m$ | $Z_m$ | $\theta_m$ | $\phi_m$ | $\rho_m$ |

FIG.14

THREE-DIMENSIONAL GAME APPARATUS AND IMAGE SYNTHESIZING METHOD

BACKGROUND OF THE INVENTION

1. Field of the Invention

The present invention relates to a three-dimensional game apparatus which can synthesize a filed image from any view in a virtual three-dimensional space, and an image synthesizing method usable in such a three-dimensional game apparatus.

2. Description of the Prior Art

In many game systems, various proposals have been made to create a so-called virtual game world in a displayed game scene which has been more similar to real life. If such a virtual world is realized, fun of the game can be extremely improved and reality of the game world increased.

To accomplish the virtual world, it is desired that the concept of time is introduced into the game world.

A two-dimensional game system in which a two-dimensional game scene is displayed on a display or the like can give a passage of time to a player, for example, by taking such a technique that the daytime game scene is brightened while the nighttime game scene is darkened. Such a technique may provide a plurality of pallets for forming the game scene. For the daytime game scene, a pallet for providing a brighter color to the game scene is selected. For the nighttime game scene, another pallet for providing a darker color to the game scene is selected. However, this technique can only select either the brighter or darker game scene. Thus, the prior art cannot represent the sun which moves with the passage of time, the changing color of the sky or the gradually darkening background in the nighttime game scene. Therefore, the game systems of the prior art represents the game world with less reality.

In a combat game, for example, players select game characters 230 and 232 as shown in FIG. 20A, respectively. The players then control the actions of the game characters 230 and 232 for causing them to fight each other while viewing such a game scene as shown in FIG. 20B. In this case, the type of the displayed game stage depends on the type of the selected game character or the like. If a competitor or the like belongs to a country A, for example, a game stage may include buildings 234 in a country-A design and an audience 236 of the country A. This can provide a sense in which a player actually fights the competitor in the country A. If the player defeats the competitor of the country A, the game proceeds to the next game stage. In the next game stage, the player then fights another competitor of a country B. This stage is in a country-B style. Thus, the game sequentially proceeds to the other game stages as the player defeats the competitors.

In such a game apparatus having a plurality of game stages, a game stage presents a nighttime scene while another game stage presents a daytime scene. In the same game stage, the setting of time will not be changed. This will cause the game to lack variety.

Even though the passage of time can be presented in the same game stage, the start of that game stage may be in nighttime or daytime. Similarly, the game stage lacks variety.

In many arcade game machines, a demo scene is frequently displayed while no player plays the game. One technical object would be to give more variety to such a demo scene.

It is now considered the presentation of various heavenly bodies such as moon and stars on a game scene in the combat game or the like. In such a case, it is relatively easy that these heavenly bodies appear in the nighttime and disappear in the daytime. However, it is very difficult to present a game scene in which the heavenly bodies gradually appear as the sky becomes dark and gradually disappear as the sky becomes bright. An object of the prior art would be to provide a simple technique for such a presentation of a game scene.

To overcome the problems in the prior art, the present invention has an object to provide a three-dimensional game apparatus in which a player can sense the passage of time and to provide an image synthesizing method usable in such a three-dimensional game apparatus.

Another object of the present invention is to provide a three-dimensional game apparatus in which a game scene represented at each game stage was variety, and to provide an image synthesizing method usable in such a three-dimensional game apparatus.

Still another object of the present invention is to provide a three-dimensional game apparatus which can represent the passage of time when a game is not played, and to provide an image synthesizing method usable in such a three-dimensional game apparatus.

A further object of the present invention is to provide a three-dimensional game apparatus which can provide objects which gradually disappear or appear as the brightness of the game scene varies through the passage of time, and to provide an image synthesizing method usable in such a three-dimensional game apparatus.

DISCLOSURE OF THE INVENTION

To this end, the present invention provides a three-dimensional game apparatus for synthesizing a field image from any view in a virtual three-dimensional space and displaying the synthesized field image to a player, comprising: virtual time computation means for determining a virtual time by computing a passage of time in the virtual three-dimensional space based on the actual passage of time in the real space, means for computing at least the positional information of an object disposed in the virtual three-dimensional space and the positional information of a light source by using the virtual time, the light source moving in the virtual three-dimensional space with the passage of the virtual time, and three-dimensional computation means for performing a three-dimensional computation including a shading computation on the object disposed in the virtual three-dimensional space by using the computed positional information of the light source.

According to the present invention, the virtual time is computed from the actual passage of time in the real space. The computed virtual time is used to determine the position of a light source such as the sun. The determined positional information of the light source is then used to perform a three-dimensional computation such as shading and the like. As the game time passes, the virtual time also passes so that the light source moves to provide different effects of the shading and the like through the shading computation. Thus, the player can sense the passage of time.

In another aspect of the present invention, the three-dimensional computation means selects the positional range in which the light source is positioned from a plurality of positional ranges;

and wherein the three-dimensional computation means varies the contents of the three-dimensional computation to be performed on the object, each time the positional range in which the light source is positioned changes.

According to the present invention, the contents of the three-dimensional computation vary in such a manner that a morning haze is presented through a depth-cueing computation when the light source is positioned in a first positional range, and the color of the light source is varied through the passage of the virtual time when the light source is positioned in a second positional range. Thus, the load on the three-dimensional computation can be reduced so that the real presentation can be accomplished while maintaining the real-time property required by the three-dimensional game apparatus.

The present invention also provides a three-dimensional game apparatus for synthesizing a field image from any view in a virtual three-dimensional space, displaying the synthesized field image to a player and including game stages each having a different game setting, comprising: virtual time computation means for determining a virtual time by computing a passage of time in the virtual three-dimensional space based on the actual passage of time in the real space, means for computing at least the positional information of an object disposed in the virtual three-dimensional space, three-dimensional computation means for performing a three-dimensional computation including a shading computation on the object disposed in the virtual three-dimensional space by using the virtual time, and wherein the virtual time computation means computes the virtual time of one of the game stages when a game scene proceeds from a prior game stage to the one of the game stages, a starting point in computing the virtual time of the one of the game stages being a terminating point in computing the virtual time of the prior game stage.

When the game scene proceeds from the prior game stage to the one of the game stages, the one of the game stages starts at the terminating point of the prior game stage. Thus, the game scene of the one of the game stages varies depending on how much time the prior game stage spends or the like. Each of the game stages can have various forms. Thus, variety is added to the game stages to provide an interesting machine.

The present invention further provides a three-dimensional game apparatus for synthesizing a field image from any view in a virtual three-dimensional space, displaying the synthesized field image to a player and including game stages each having a different game setting, comprising: virtual time computation means for determining a virtual time by computing a passage of time in the virtual three-dimensional space based on the actual passage of time in the real space, means for computing at least the positional information of an object disposed in the virtual three-dimensional space, three-dimensional computation means for performing a three-dimensional computation including a shading computation on the object disposed in the virtual three-dimensional space by using the computed virtual time, and wherein the three-dimensional computation means varies the contents of the three-dimensional computation to be performed on the object when one of the game stages moves to the next game stage with the proceeding of a game scene.

According to the present invention, when the game scene proceeds from one game stage to the next game stage to change the positional information of the game stage such as its longitude, the contents of the three-dimensional computation is varied. Thus, the player can sense the movement of the game stage, improving the reality of the game.

The present invention is further characterized by that the path of a light source used by the three-dimensional computation changes with the movement of the game stages.

According to the present invention, the path of the light source such as the sun changes with the movement of the game stages to change the contents of the three-dimensional computation such as a shading computation. Thus, the shading or the like on a displayed object can be varied so that the player can sense the movement of the game stages. For example, thus, the midnight sun in the North Pole can be represented in the game scene.

The present invention further provides a three-dimensional game apparatus for synthesizing a field image from any view in a virtual three-dimensional space and displaying the synthesized filed image to a player, comprising: virtual time computation means for determining a virtual time by computing a passage of time in the virtual three-dimensional space based on the actual passage of time in the real space, means for computing at least the positional information of an object disposed in the virtual three-dimensional space, three-dimensional computation means for performing a three-dimensional computation including a shading computation on the object disposed in the virtual three-dimensional space by using the computed virtual time, and wherein the virtual time computation means computes the passage of the virtual time when no player plays the game.

According to the present invention, the virtual time passes when no player plays the game. This can provide a game scene displayed at the start of the next game stage in any of various forms. As a result, variety is added to the game stage, resulting in an interesting game machine which can be repeatedly played by the player.

The present invention is further characterized by that a demo scene is displayed when no player plays the game, and the contents thereof is varied depending on the passage of the virtual time.

According to the present invention, the virtual time passes when the demo(demonstration) scene is displayed. The displayed contents of the demo scene varies depending on how much the virtual time passes. In the demo scene, therefore, the passage of time from the morning scene through the daytime scene to the evening scene can be represented.

The present invention is further characterized by that the color in at least one of ambient light and light source which are used for the three-dimensional computation is varied depending on the passage of the virtual time.

Thus, various scenes such as a red sky and ray at sunset, a dark night sky and others can be presented enables the player to sense the passage of time.

The present invention is further characterized by that the three-dimensional game apparatus further comprises depth-cueing computation means for performing a color interpolation to bring the color of the displayed object to a predetermined color, and wherein the depth-cueing computation means varies the predetermined color depending on the passage of the virtual time.

Thus, a haze in the morning or the darkness in the night can be presented, enabling the player to sense the passage of time.

The present invention is further characterized by that when the virtual time passes and a light from the light source used in the three-dimensional computation misses the displayed object.

According to the present invention, the displayed object can be shaded based on the light from the further light source. Thus, a scene in which game characters fight each other in the night darkness can be represented more realistic.

The present invention is further characterized by that further comprising translucent computation means for drawing a translucent object by blending the color information of the background with the color information of a translucent object, and wherein the translucent computation means reduces the blending ratio of the color information of the translucent object when the amount of light from the light source used in the three-dimensional computation increases with the passage of the virtual time and increase the blending ratio of the color information when the amount of light decreases.

According to the present invention, the blending ratio of the color information (brightness information for each color component R, G or B) of a translucent object is reduced, when the amount of light in the light source increases with the passage of the virtual time. This can cause the translucent object to be fused into the background or the like. On the other hand, when the amount of light decreases, the blending ratio of the color information is increased. This can cause the translucent object to rise to the background or the like. Thus, a heavenly object fused into a brightened sky or another heavenly object appearing in a dark night sky may be presented more realistic.

BRIEF DESCRIPTION OF THE DRAWINGS

FIG. 14 is a view illustrating the information of an displayed object.

DETAILED DESCRIPTION OF THE PREFERRED EMBODIMENTS

1. First Embodiment

Figure 1:
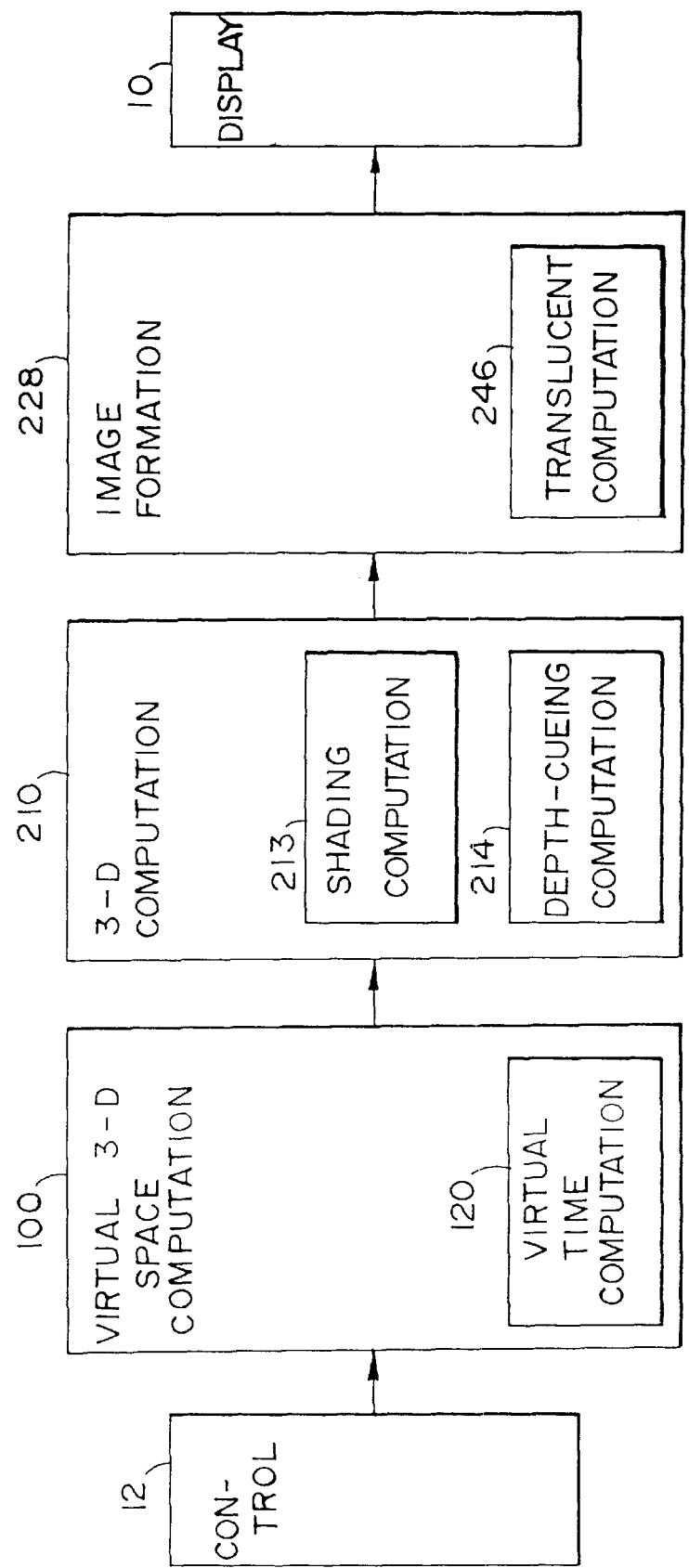
FIG. 1 is a block diagram of a first embodiment of the present invention.

FIG. 1 shows a block diagram of a first embodiment of the present invention which comprises a control unit 12, a virtual three-dimensional space computation unit 100, a three-dimensional computation unit 210, an image forming unit 228 and a display 10.

The control unit 12 receives a control signal from a player. The virtual three-dimensional space computation unit 100 is responsive to a predetermined program and the control signal from the control unit 12 for performing a computation for forming a virtual three-dimensional space. More particularly, the virtual three-dimensional space computation unit 100 may compute the positional and directional information of an object disposed in a virtual three-dimensional space at intervals of a given time period for example one field in accordance with a control signal from the control unit 12. The virtual three-dimensional space computation unit 100 includes a virtual time computation section 120 which performs three-dimensional computations such as coordinate transformation, perspective-projective transformation, shading and others. The virtual time computation section 120 includes a shading computation section 213 and a depth-cueing computation section 214. The image forming unit 228 renders an object subjected to the three-dimensional computation through the three-dimensional computation unit 210, so as to display the object on the display 10 as a field image. Thus, the field image can be provided from any viewpoint within the virtual three-dimensional space.

The virtual time computation section 120 computes a virtual time. The computation of such a virtual time is carried out based on the actual passage of time in the real space (real life). For example, the game machine may be set such that the period of two hours in the virtual three-dimensional space (game world) is equivalent to 30 seconds in real life. This embodiment will now be described in connection with a combat game to which the computation of a virtual time is applied. FIGS. 2A–6B show examples of game scenes (field images) provided according to the first embodiment.

Figure 2A:
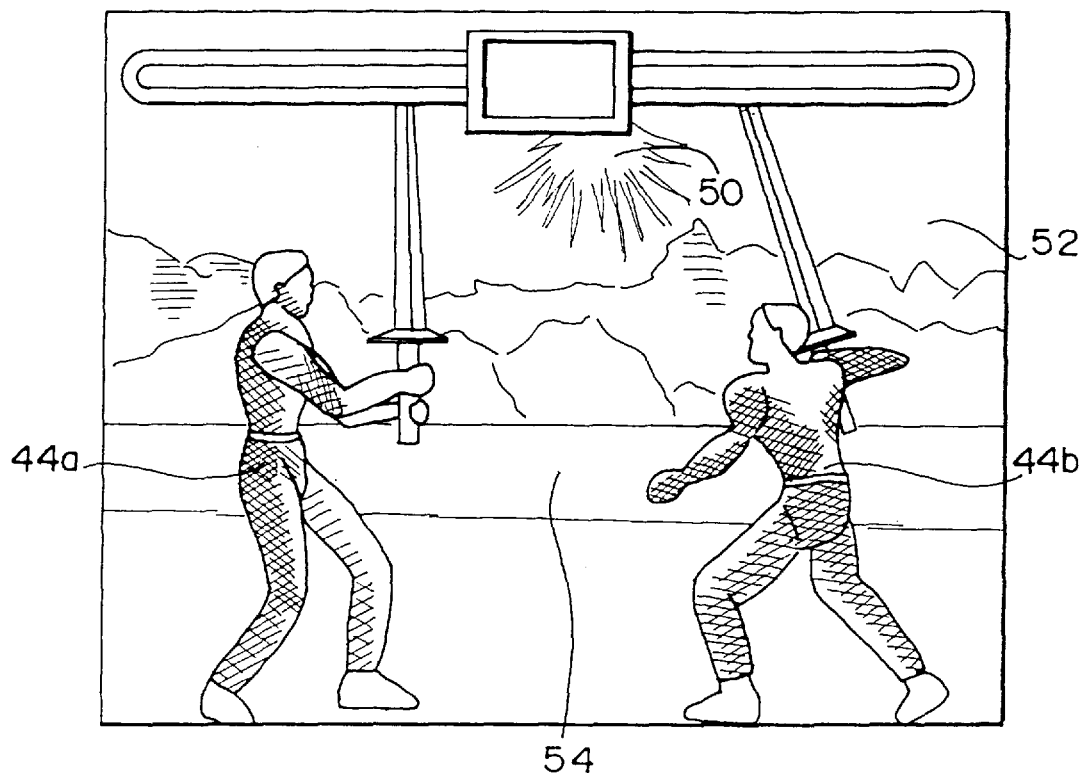
FIGS. 2A and 2B are views illustrating a game scene in the morning and a game scene with a morning haze.
Figure 3A:
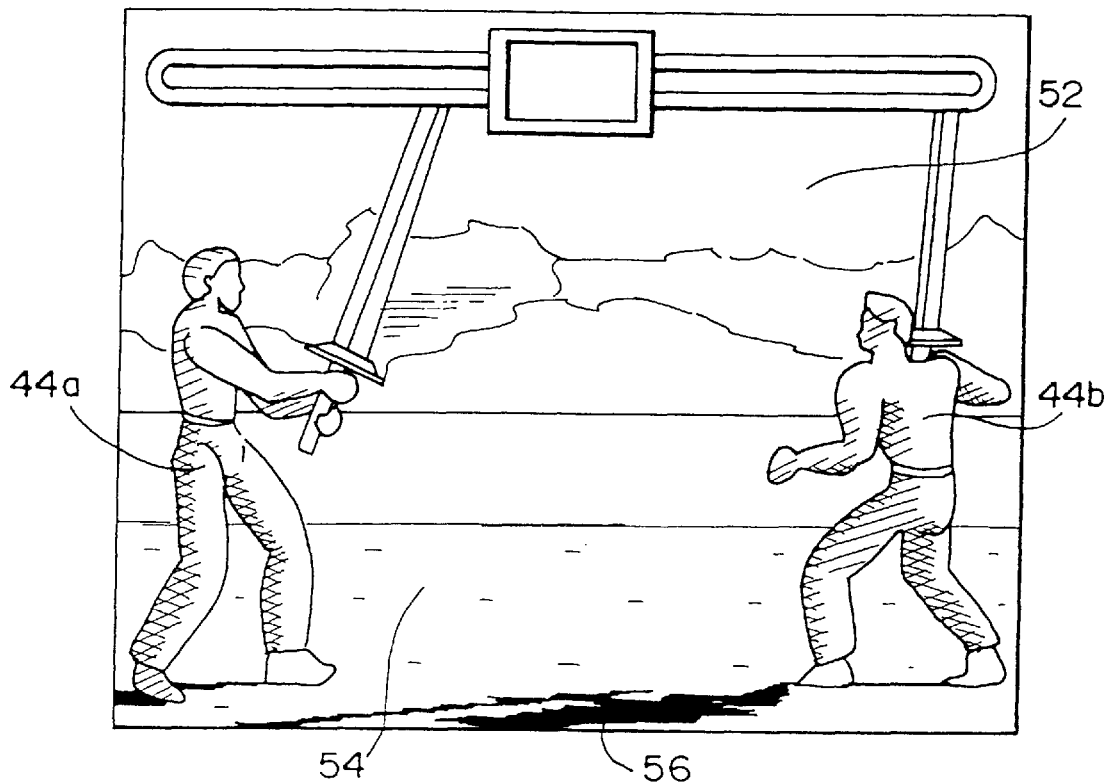
FIGS. 3A and 3B are views illustrating a game scene in the daytime and are a game scene in the evening.
Figure 3B:
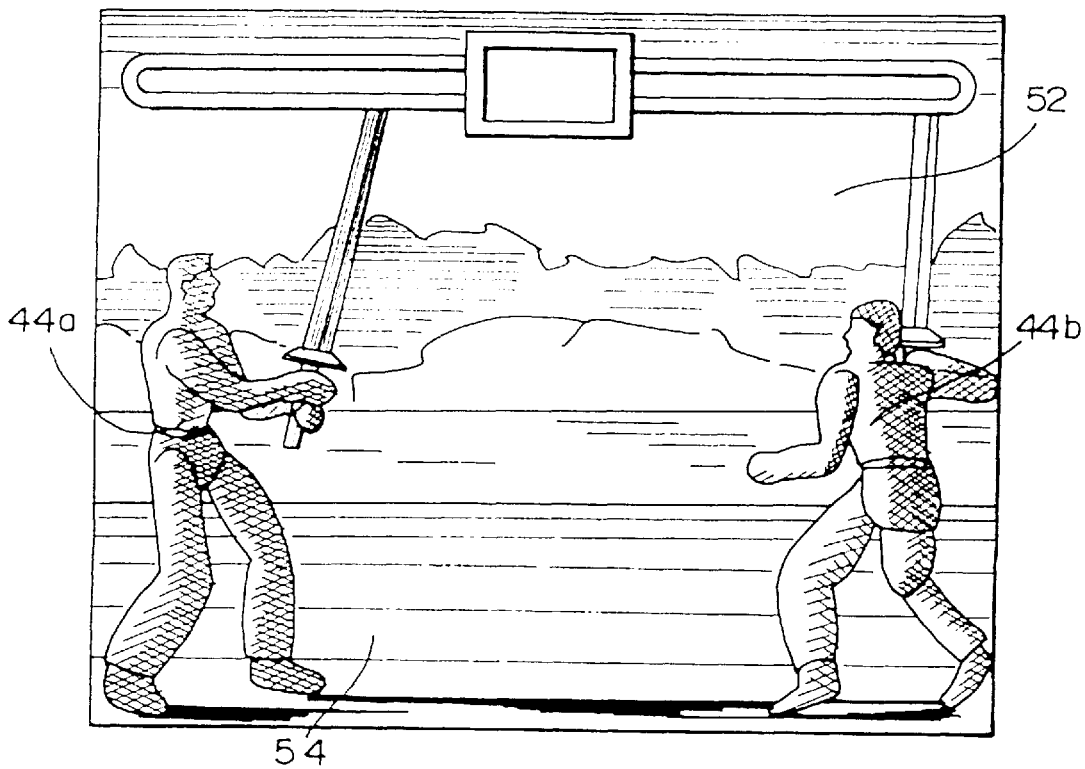
Figure 4:
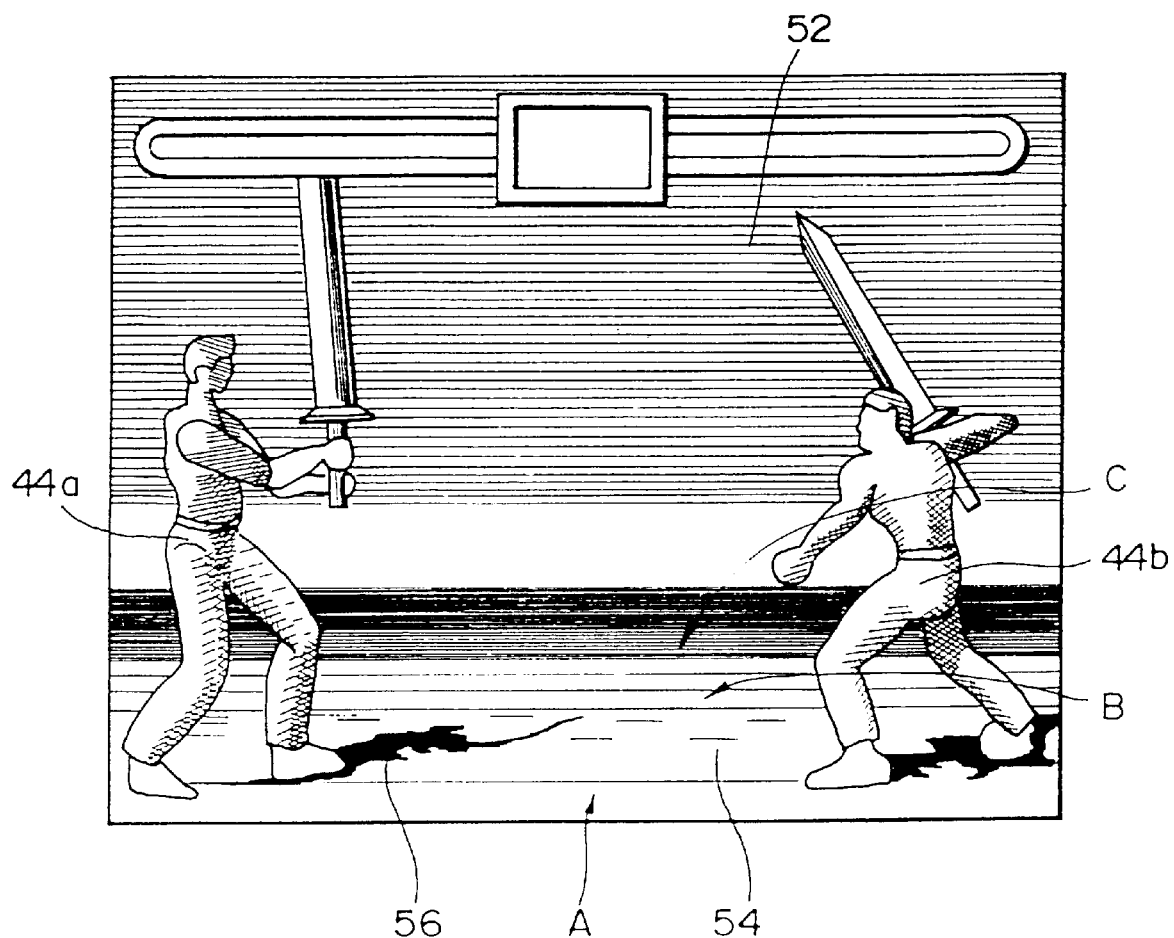
FIG. 4 is a view illustrating a game scene in the nighttime.

In this combat game, one fight is limited to two hours (30 seconds in real life).. As the fight protracts, the game stage is shifted from the morning scene (FIG. 2A) to the daytime scene (FIG. 3A), from the daytime scene to the evening scene (FIG. 3B) and from the evening scene to the nighttime scene (FIG. 4). Thus, the player can sense the passage of time. For example, FIG. 2A shows the morning scene in which the sun 50 is rising in the sky. In the daytime scene of FIG. 3A, the sun 50 has moved to the highest position. In the evening scene of FIG. 3B, the sun 50 is setting in the horizon. At this point, the positional information of the sun is computed based on the virtual time computed by the virtual time computation section 120. In other words, the sun moves on a given path depending on the passage of the virtual time.

In this embodiment, the sun is considered to be a moving light source which is in turn used in the shading computation. The shading computation is carried out in the shading computation section 213. Since FIG. 2A for example shows the sun located in the screen at a central position, game characters 44a and 44b will be shaded provided that the light source is located at the farthest from viewpoint position. Since FIG. 3A shows the sun located in the screen at the upper rightward position, the game characters 44a and 44b will be shaded creating shadows 56 provided that the light source is located at the upper rightward position. In FIGS. 2A and 3A (morning and daytime), the ground 54 is lightened by the sun light to have a brighter color. In FIGS. 3B and 4 (evening and night), however, the ground 54 is darkened.

According to this embodiment, at least one of the ambient light and light source used in the three-dimensional computation unit 210 is varied depending on the passage of the virtual time. More particularly, the light is colored red in the evening scene to present the sunset. In this embodiment, the color of the sky 52 is also varied depending on the passage of the virtual time. The sky is paled in the morning scene of FIG. 2A; the sky is blue in the daytime scene of FIG. 3A; the sky is dark red in the evening scene of FIG. 3B; and the sky is black in the nighttime scene of FIG. 4.

Figure 5A:
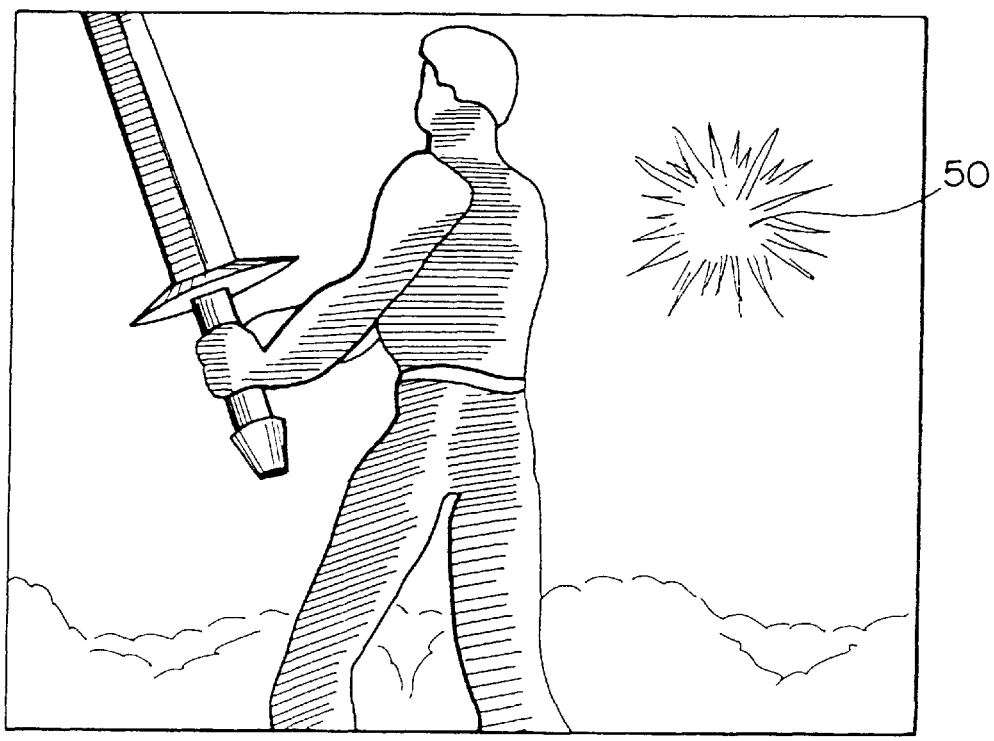
FIGS. 5A and 5B illustrate the varying form of the sun.
Figure 5B:
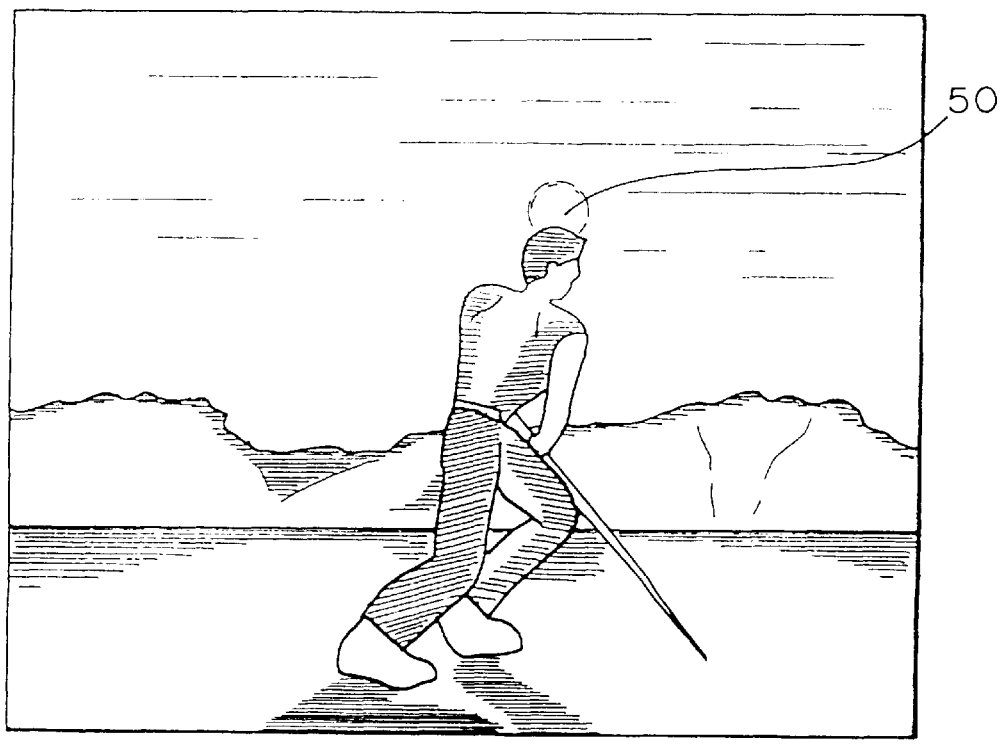

In this embodiment, the shape of the sun displayed on the game scene is also varied depending on the passage of the virtual time. For example, FIG. 5A shows the shape of the sun 50 displayed in the daytime scene, while FIG. 5B shows the shape of the sun 50 displayed in the evening scene. Similarly, the waxing and waning of the moon can be presented.

Figure 2B:
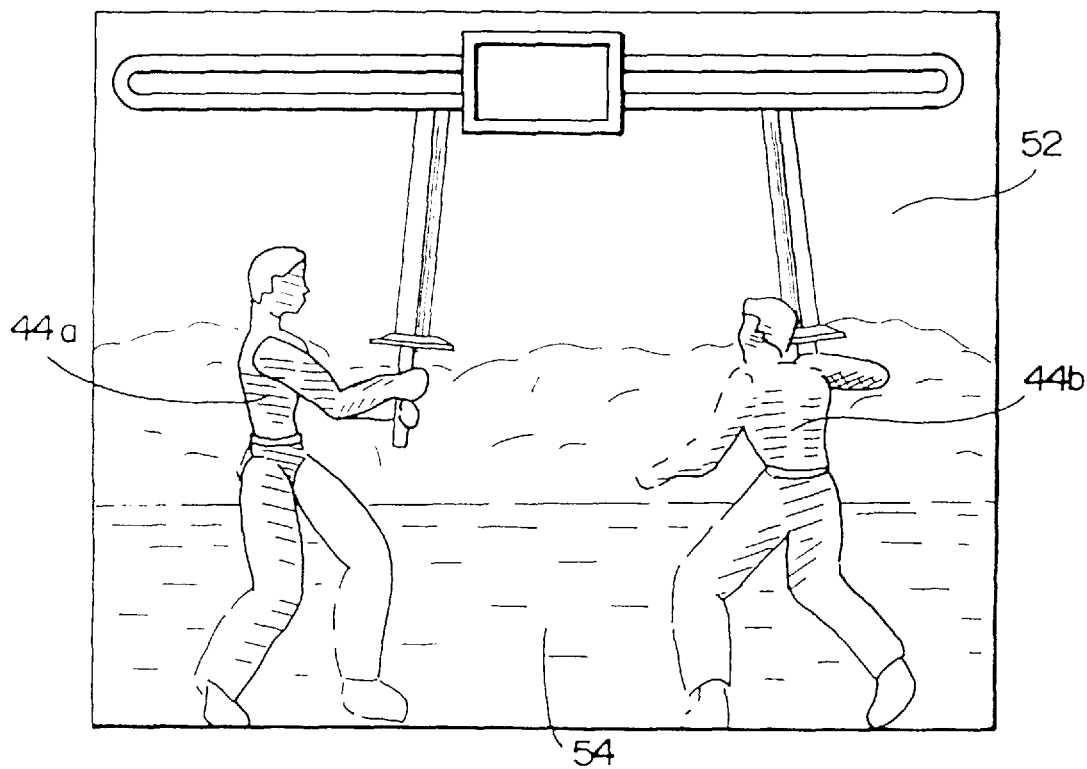

In this embodiment, the following technique is used for enabling the player to sense the passage of time. For example, FIG. 2B shows the game scene with the morning haze. The morning haze can be presented by providing a translucent object (translucent polygon) and blending the color information of such a translucent object with that of the background through a translucent computation section 246.

This embodiment also uses a depth-cueing computation for presenting the morning haze or the night darkness. The depth-cueing computation is carried out by the depth-cueing computation section 214. In the nighttime scene of FIG. 4, for example, the depth-cueing computation is carried out such that the displayed color is gradually becomes black toward the location fartherest from viewpoint in the game scene. More particularly, the ground 54 is black and the gradation in color is noted in the order of A, B and C as shown in FIG. 4. The depth-cueing computation section 214 may be provided in the image forming unit 228 instead of the three-dimensional computation unit 210.

To present the nighttime scene more effectively, this embodiment provides a further light source used when the sun light does not reach the object in the nighttime scene. The shading computation is carried out based on the light of the further light source. More particularly, FIG. 4 shows this further light source located in the game scene at the lower left position. The light of the light source will be used to shade the game characters 44a and 44b and to create the shadows 56. Such an atmosphere in which the fighters fight each other in the night darkness can be presented with reality. It is desirable that the position and type of the further light source are varied depending on the game stage. For example, lightening bugs flying in a grassy scene at night may be used as further light sources (moving light sources). In a harbor scene, indicating lamps in ships may be used as further light sources.

Figure 6A:
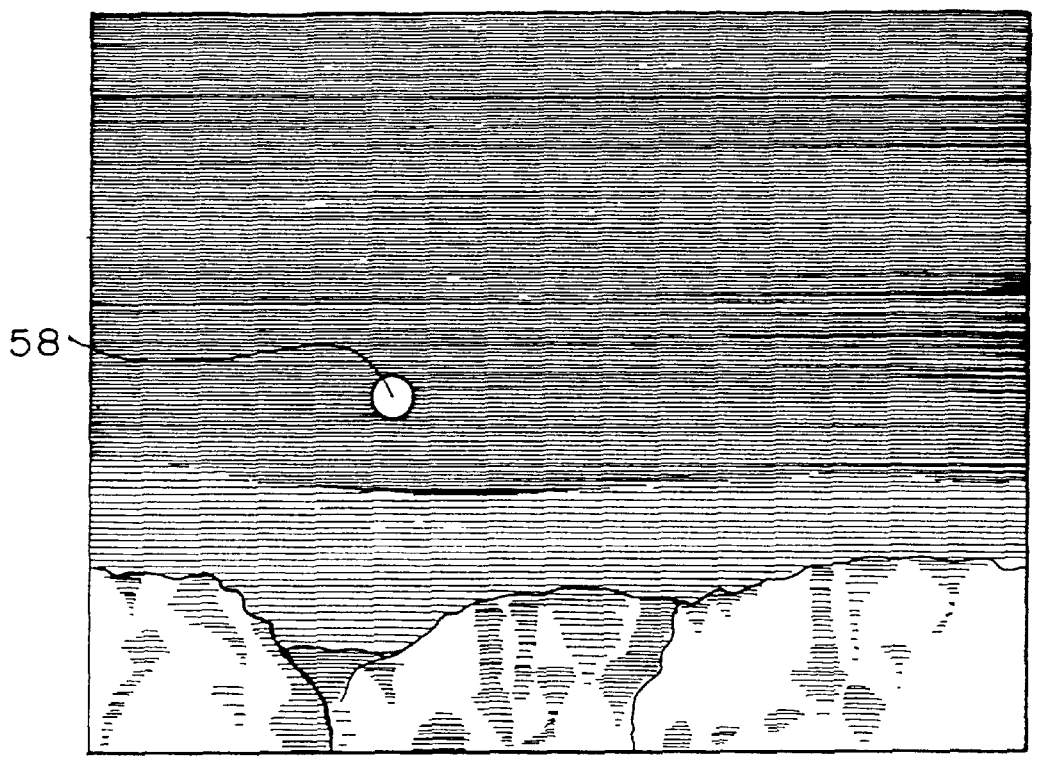
FIGS. 6A and 6B illustrate an heavenly body subjected to a translucent computation.
Figure 6B:
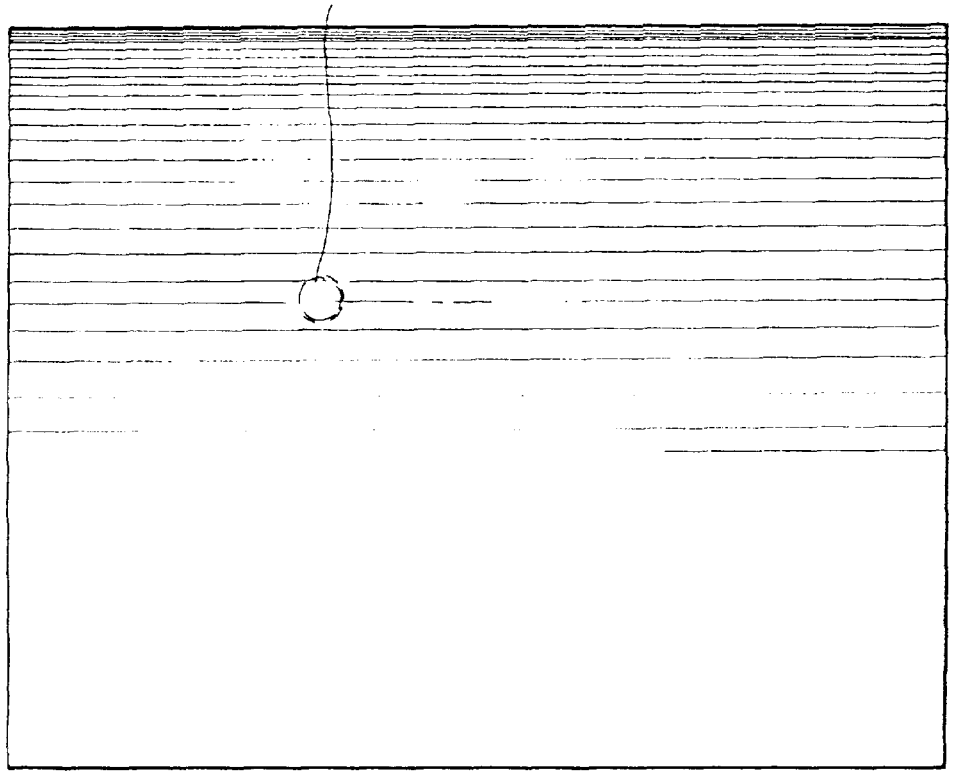

In this embodiment, furthermore, moon, stars, asterisms, falling stars and the like can be presented in the following manner. FIG. 6A shows the moon 58 appearing at night, while FIG. 6B shows the moon 58 disappearing as the sky is brightened in the morning. This embodiment provides a translucent object to present the moon 58 disappearing in the brightened sky. As described, the translucent computation section 246 blends the color information of the background (sky) with that of the translucent object or moon 58. In such a case, if the amount of light in the light source (sun) used in the three-dimensional computation unit 210 increases as the virtual time passes and the morning approaches, the percentage of the color information of the moon to be blended is reduced in the translucent computation section 246. As shown in FIG. 6B, thus, the moon 58 is gradually cleared and disappears as the sky brightens. On the other hand, if the amount of light decreases as the virtual time passes and the night approaches, the percentage of the color information of the moon to be blended is increased. Thus, the moon 58 gradually appears in the night sky. According to this embodiment, thus, the moon 58 can be presented with reality through such a simplified technique utilizing the translucent computation. Similarly, asterisms, falling stars and the like can be presented in the night sky.

Although this embodiment enables the player to sense the passage of time through the shading and other computations, this embodiment is characterized by the passage of the virtual time independently of the player's control, game result and the like. Therefore, the player may sense the passage of time with more reality. In car racing and other games, the passage of time can be presented by darkening and lightening the game scene as the cars run through a given distance. However, such a technique does not cause the time to pass if a racing car does not advance in the forward direction. More particularly, since the passage of the virtual time highly depends on the player's control, game results and the like, such a technique cannot present the passage of time independently of the player's control and others. Therefore, the player cannot sense the passage of time with less reality. This embodiment does not have such a disadvantage.

Figure 7:
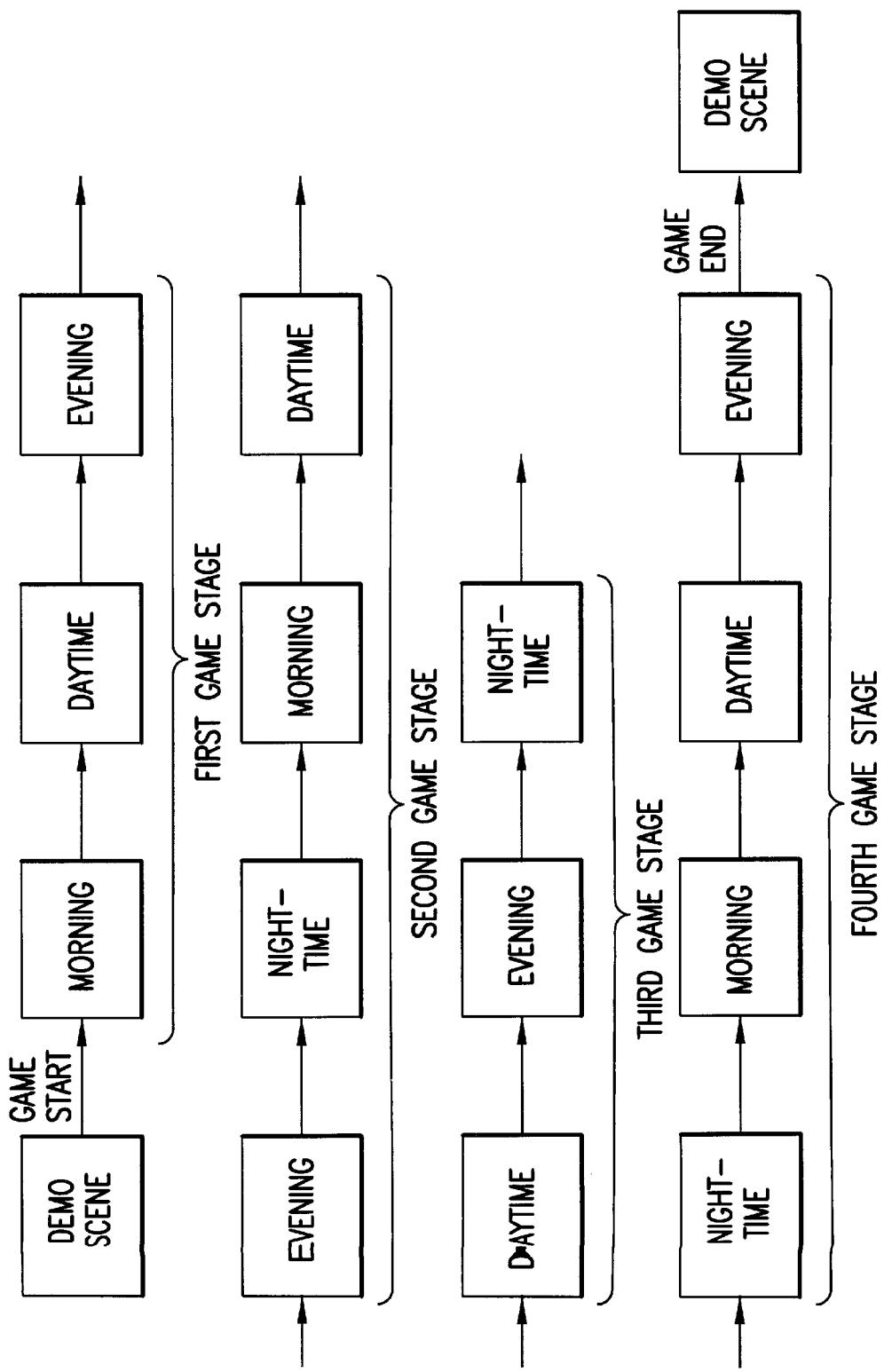
FIG. 7 is a view illustrating the passage of time when a plurality of game stages are used.

This embodiment also provides the following feature. It is now assumed that this embodiment is applied to a three-dimensional game machine having a plurality of game stages, each of the game stages having a different game setting. In combat and other games, the game stage is replaced by another game stage when the player fights a different competitor. If the player defeats the competitor in the first game stage, the game is shifted to the second game stage. The first and second game stages have different fighting scenes with different buildings and topographies. In such a case, this embodiment computes the virtual time in the second game stage starting from the virtual time on termination of the first game stage. In FIG. 7, for example, the first game stage begins at the morning scene (see FIG. 2A). It is now assumed that the game scene shifts from the morning to the daytime and from the daytime to the evening through the passage of the virtual time, and that the player defeats the competitor in the evening scene with the game scene being shifted to the second game stage. As shown in FIG. 7, the second game stage begins in the evening game scene (more exactly on termination of the first game stage). If the second game stage terminates in the daytime scene, the third game stage begins in the daytime scene. If the third game stage terminates in the nighttime scene, the fourth game stage begins in the nighttime scene.

In the prior art, time is allocated to each stage such that the first stage begins in the morning and the second stage begins in the daytime. In contrast, this embodiment varies the game scene on start of the second game stage depending on time required to clear the first game stage. For example, if time is further required to clear the first game stage in FIG. 7, the second game stage will begin in the nighttime scene. Thus, the game start scene in each of the game stages is variable depending on the time consumed by the player. When the player is to play the next game, he or she can play the game with renewed enthusiasm. Thus, the variety and fun of the game can be extremely improved.

Figure 8A:
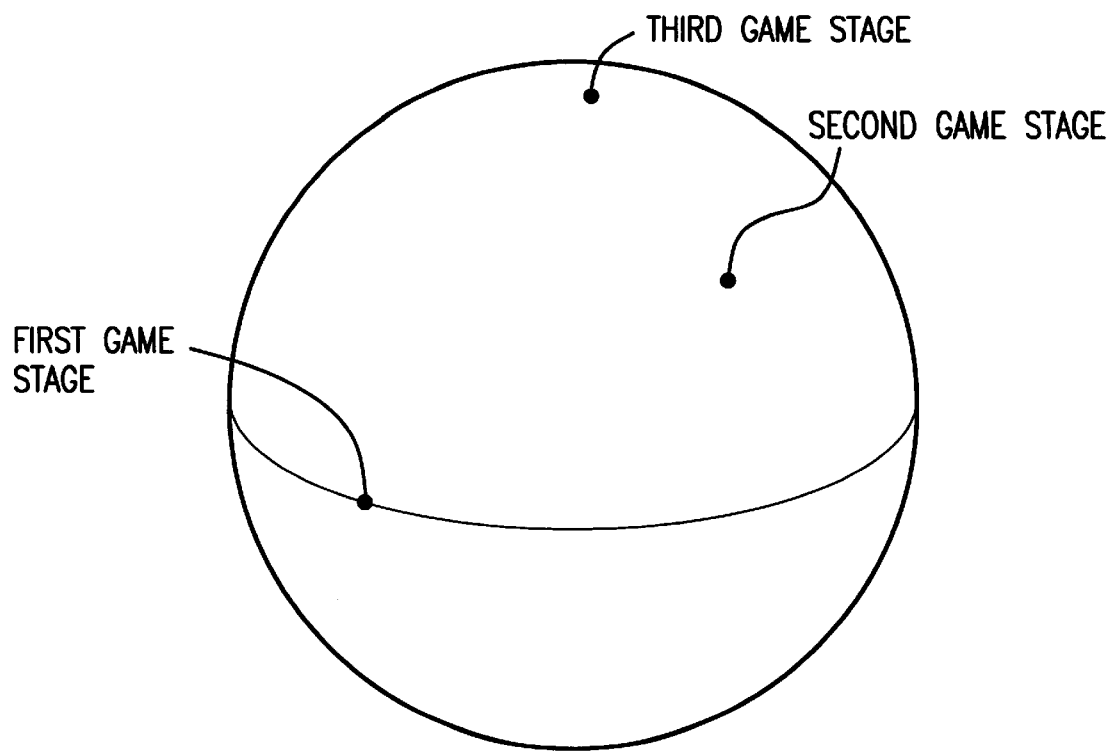
FIGS. 8A and 8B illustrate the movements of game stages and associated variations of the path of the sun.
Figure 8B:
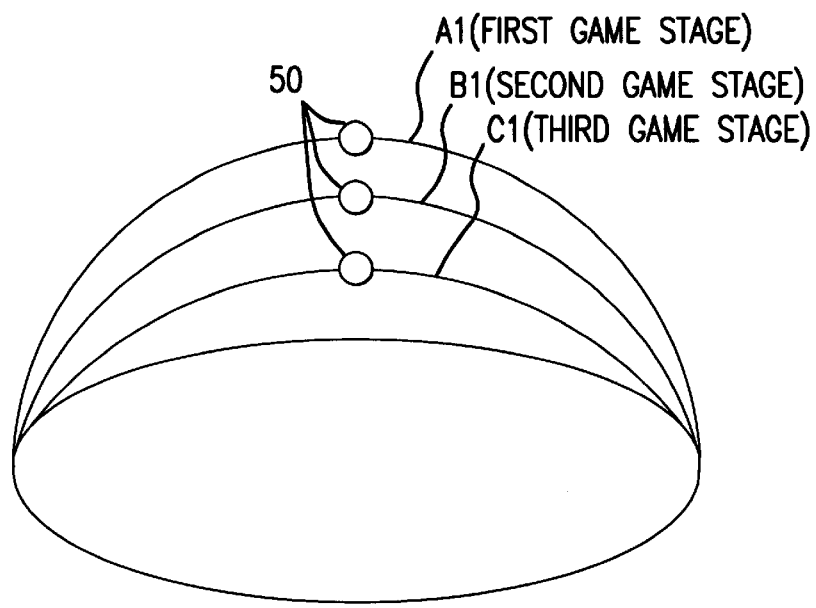

When the game stage is shifted to the next game stage and if the position of the game stage is moved, this embodiment varies the contents of the three-dimensional computation to be applied to the object. In FIG. 8A, for example, the first game stage is positioned just below the equator; the third game stage is located close to the North Pole; and the second game stage is disposed on an intermediate longitude between the equator and the North Pole. As shown in FIG. 8B, the sun 50 is moved on a path A1 in the first game stage, a path B1 in the second game stage, and a path C1 in the third game stage. The shading and other computations are executed to move the light sources on these paths. If the first game stage is shifted to the second game stage, for example, the sun or light source at the midday will be further out of position in a downward direction. Therefore, the objects such as game characters will also be shaded differently and thus forming shadows with different shapes. When the game scene is shifted to the third game stage, the sun moves along a lower path so that the midnight sun or the like can be presented. The contents of the three-dimensional computation may be varied connection with shift of the game stages. The contents include the path of the sun or light source, the color of the other light sources, the shading computation, the depth-cueing computation and the translucent computation.

Figure 9:
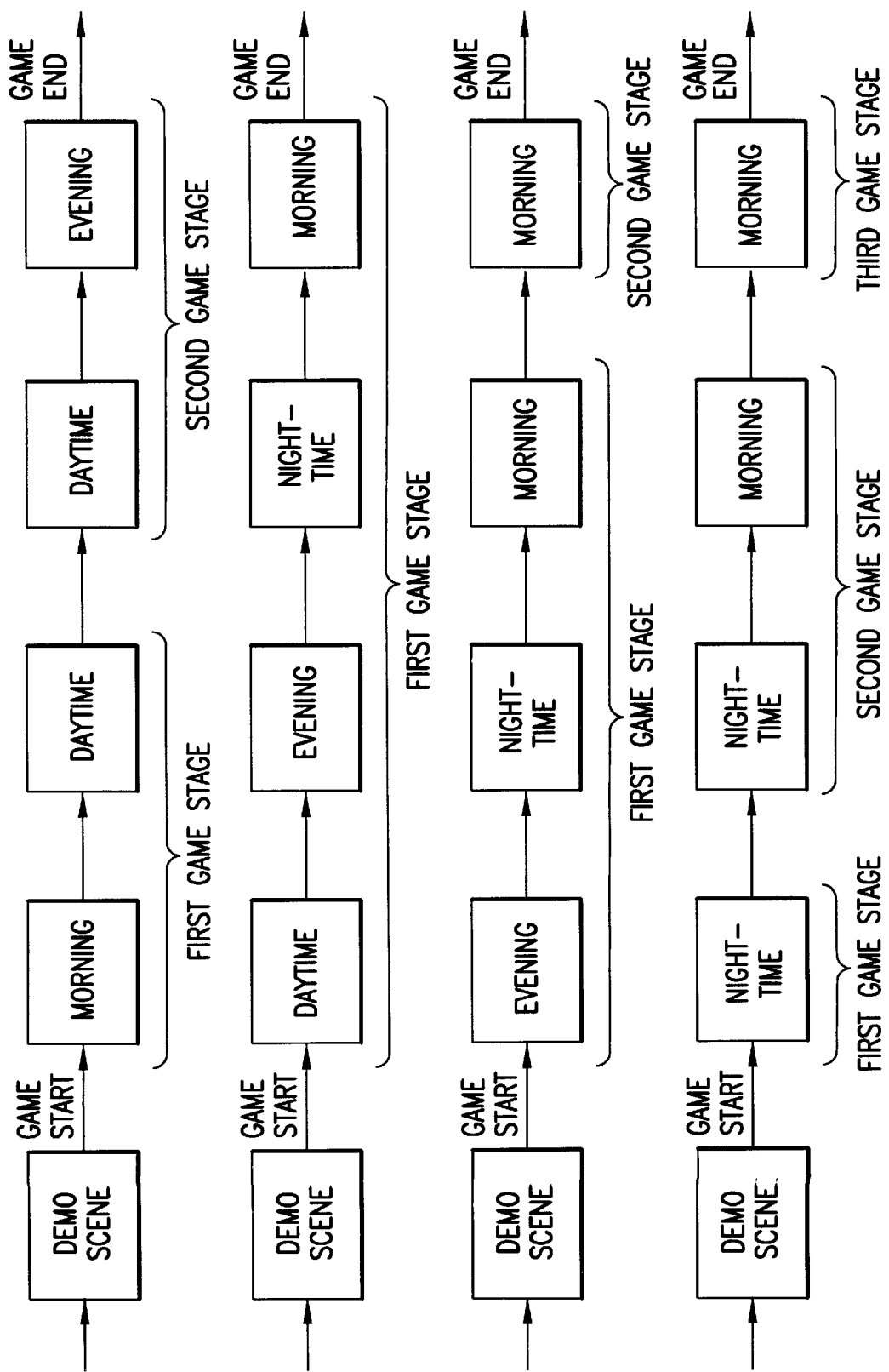
FIG. 9 is a view illustrating the passage of virtual time when no game is played.

This embodiment displays a demo scene and others when the machine is powered on to start the passage of the virtual time and if no game is played by the player, for example, in a service game apparatus. As a coin is thrown into the machine to start the game, the first game stage is displayed as shown in FIG. 9. When the player terminates the game after the first and second game stages have been terminated, the demo scene will be displayed. In this embodiment, the virtual time passes during the demo scene and when the player is not playing a game. Thus, the game scene displayed on start of the next game can be in various forms. In FIG. 9, for example, the game stage can be started in the morning, daytime, evening or nighttime scene, depending on the last game scene of the previous stage has and the passage of time in the demo scene. Thus, one game stage can have various different scenes. It is possible to give more variety to the game stage. Therefore, the player can always play the game with a new challenge, providing an interesting games.

In this embodiment, the displayed contents of the demo scene is also varied depending on the passage of the virtual time. More particularly, the demo scene also displays the moving sun or light source to show sequentially the morning, daytime, evening and nighttime scenes. Since the passage of time is graphically but not numerically displayed, the present invention can provide a more interesting game.

2. Second Embodiment

Figure 10:
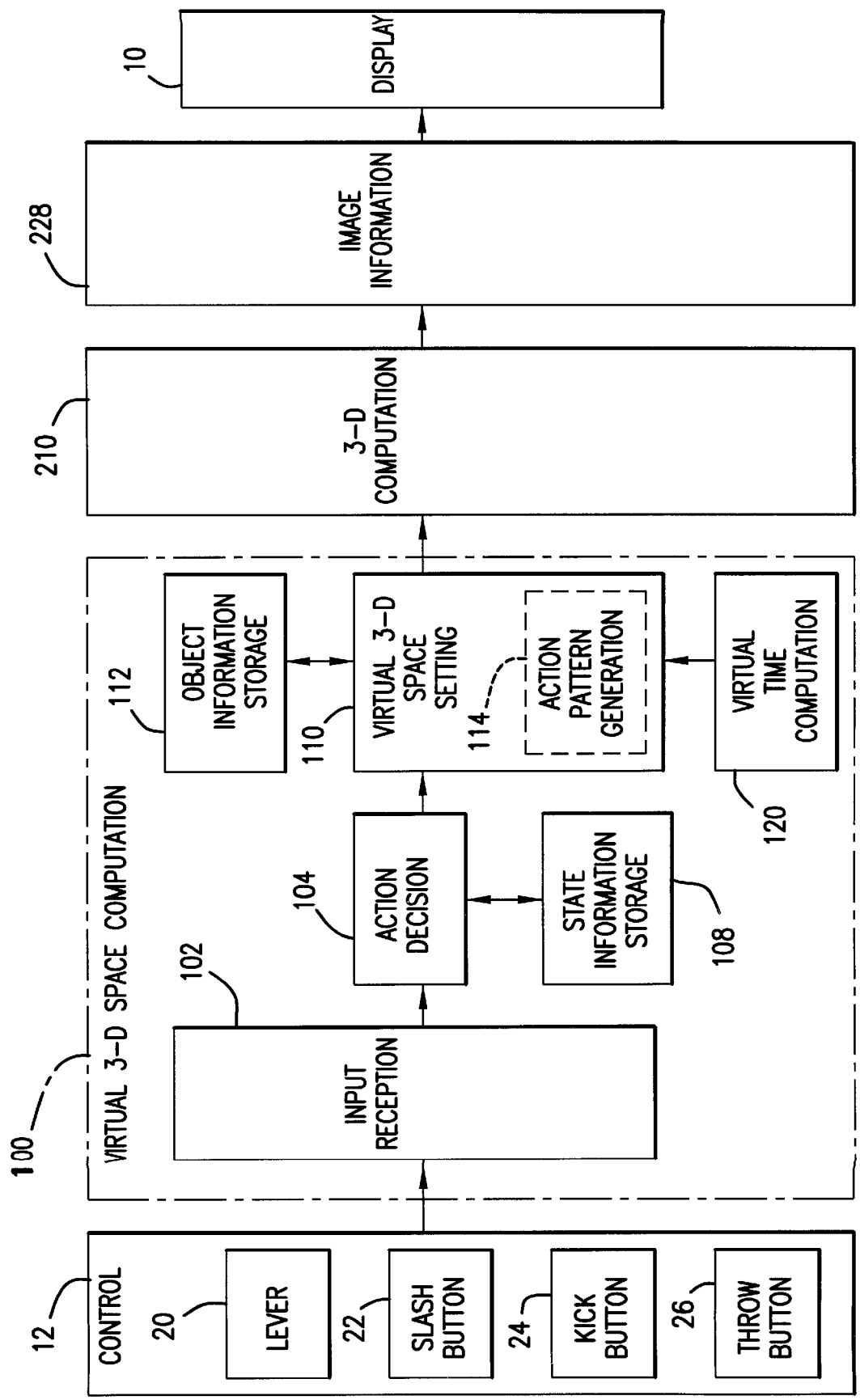
FIG. 10 is a block diagram of a second embodiment of the present invention.
Figure 11:
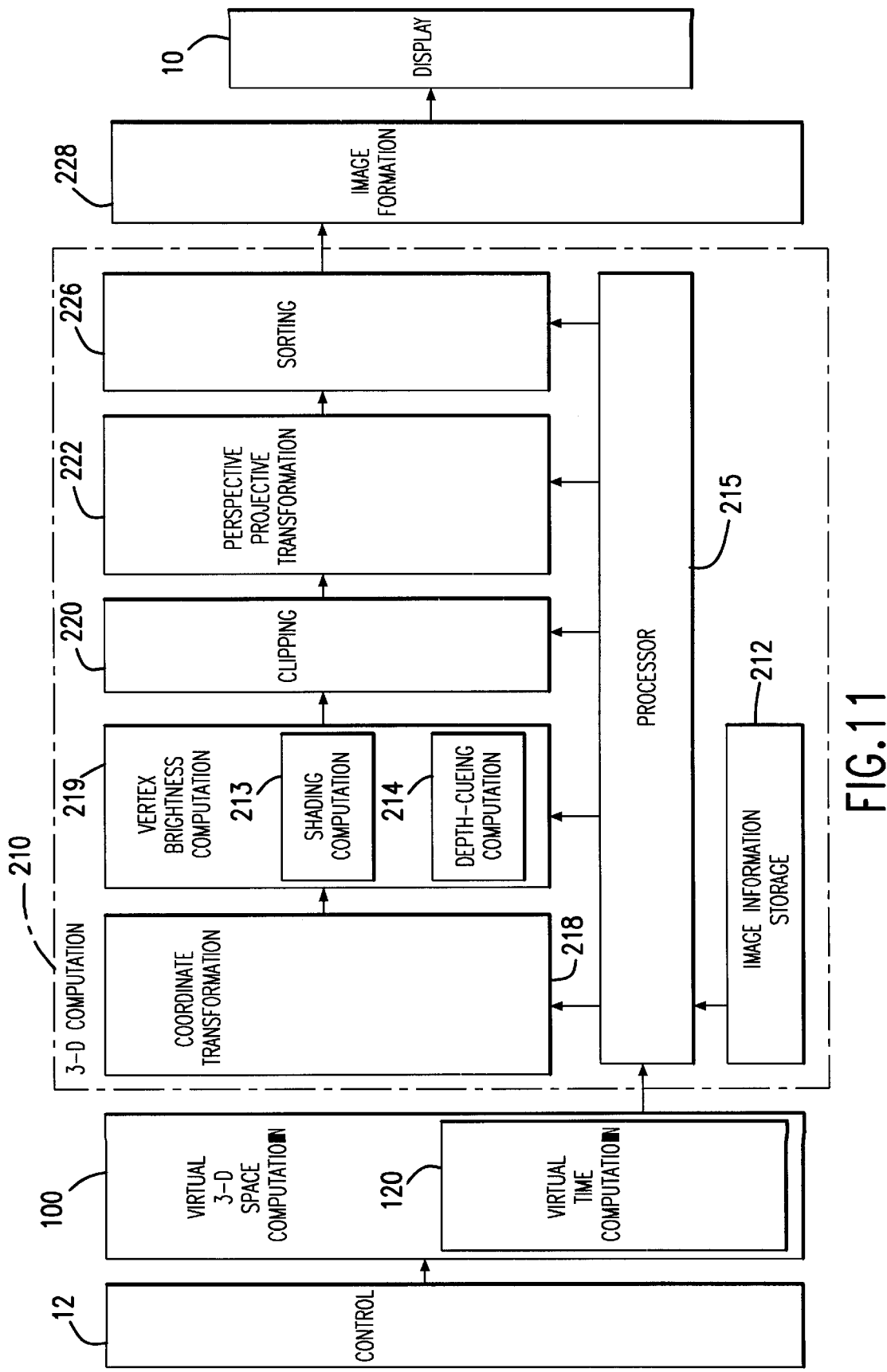
FIG. 11 is a block diagram of the second embodiment of the present invention.
Figure 12:
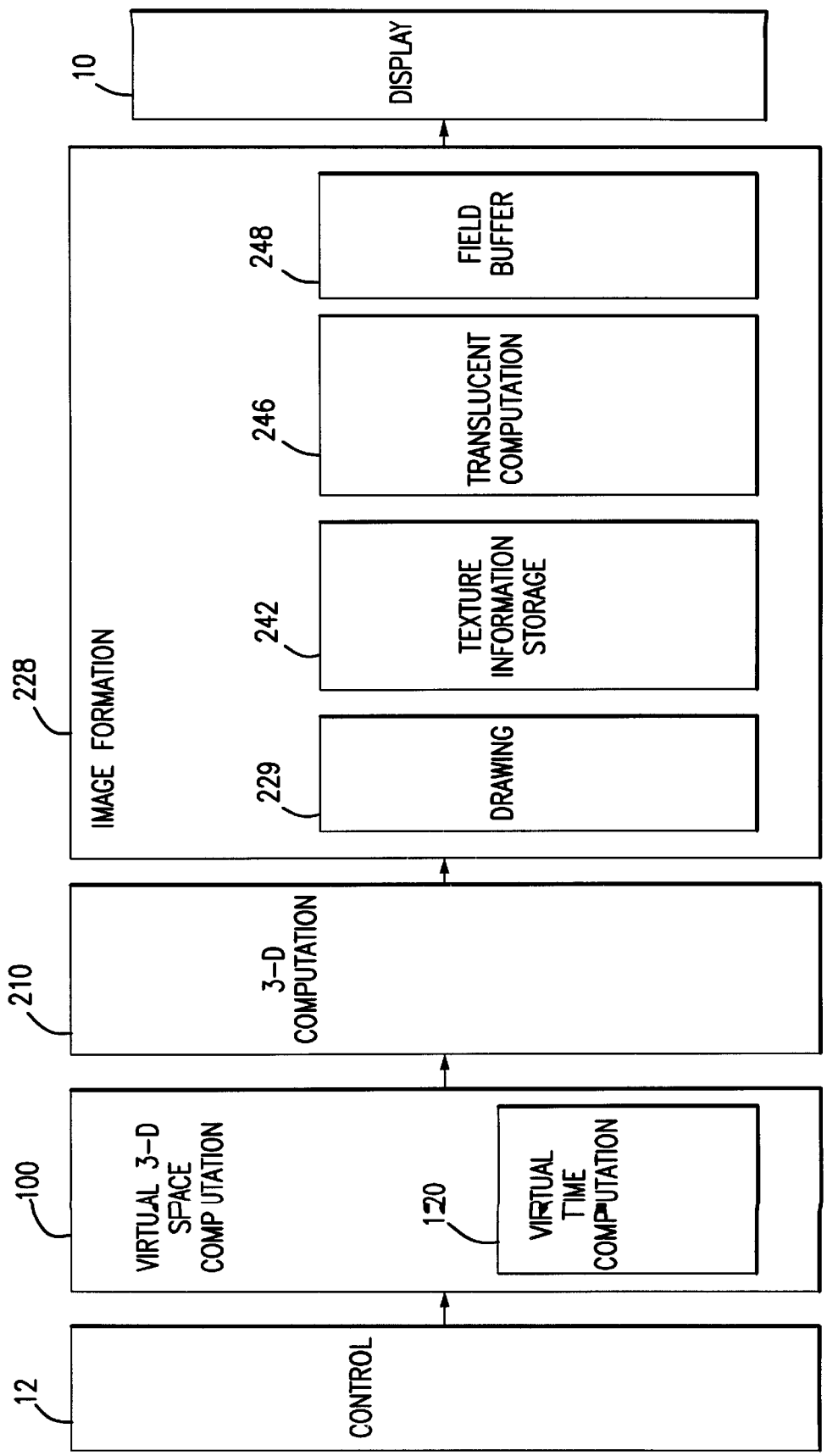
FIG. 12 is a block diagram of the second embodiment of the present invention.

FIGS. 10–12 show block diagrams relating to the second embodiment of the present invention. The second embodiment forms part of the detailed structure in the first embodiment. FIG. 10 shows the details of the virtual three-dimensional space computation unit 100; FIG. 11 shows the details of the three-dimensional computation unit 210; and FIG. 12 shows the details of the image forming unit 228.

Figure 13:
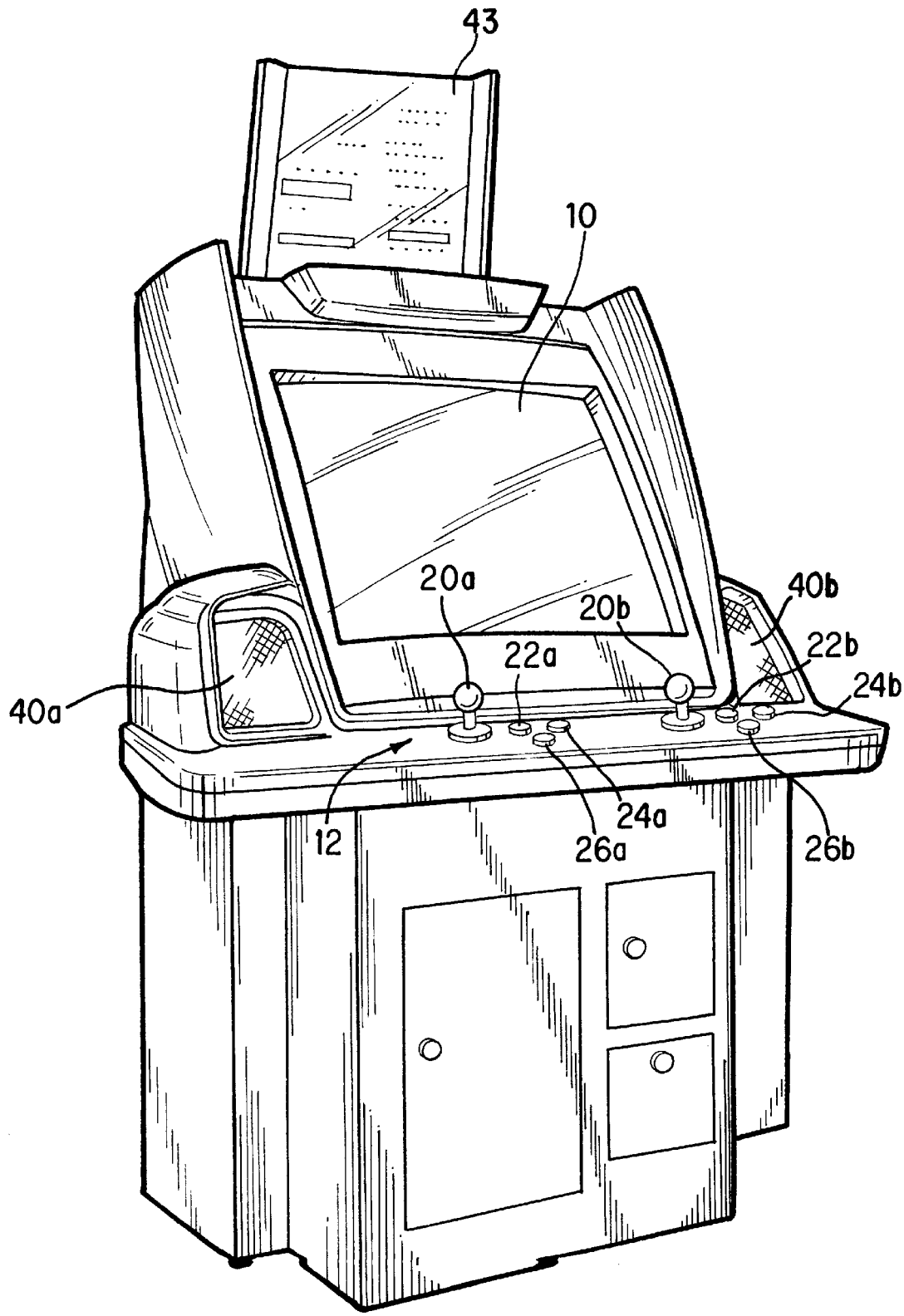
FIG. 13 is a perspective view of an arcade game machine to which the second embodiment is applied.

FIG. 13 shows a three-dimensional game apparatus for game arcade to which the second embodiment of the present invention is applied. As shown in FIG. 13, this three-dimensional game apparatus comprises a display 10 on which a game scene (field image) is displayed, a control unit 12 manually operated by a player and speakers 40a and 40b emitting game sounds. The player can enjoy playing a combat game by actuating the control unit 12 to control the action of a game character, while watching the game character and hearing the game sounds from the speakers 40a and 40b.

The structure of this embodiment will now be described with reference to FIGS. 10–12 showing the block diagrams.

First, the details of the virtual three-dimensional space computation unit 100 will be described in connection with FIG. 10. The control unit 12 includes a lever 20, a slash button 22, a kick button 24 and a throw button 26 (also see FIG. 13). These lever and buttons are used to supply action indicating signals to the virtual three-dimensional space computation unit 100.

The virtual three-dimensional space computation unit 100 is actuated by the control signal from the control unit 12 and a predetermined program. The virtual three-dimensional space computation unit 100 comprises an input receiving section 102, an action deciding section 104, a state information storing section 108, a virtual three-dimensional space setting section 110, an object information storing section 112, and a virtual time computation section 120 and an action pattern generating section 114.

The input receiving section 102 receives the action indicating signal from the control unit 12. The action deciding section 104 is responsive to the action indicating signal from the input receiving section 102, the state information of the present game character stored in the state information storing section 108 for deciding the action of that game character to be executed.

When the action deciding section 104 decides the action of the game character, the action pattern generating section 114 in the virtual three-dimensional space setting section 110 generates a decided action pattern. For example, if the slash button 22 is depressed to decide the combating action of the game character with a blade, such an action pattern that the game character is changed from its guard position to its blade swinging position will be generated.

The object information storing section 112 stores information relating to various objects such as head, body, arms, legs of game characters or sun, moon, stars and buildings. The object information includes an object number specifying the positional, directional and image information of each object. FIG. 14 illustrates examples of these object information. In this embodiment, these objects are presented by combining a plurality of polygons.

The virtual three-dimensional space setting section 110 updates the object information stored in the object information storing section 112 at intervals of a given time period (for example, one field (one-sixtieth seconds)), based on the action pattern generated by the action pattern generating section 114. The updated object information is outputted toward the three-dimensional computation section 210.

The virtual three-dimensional space setting section 110 also updates the object information relating to the sun, moon, stars and others. The object information is updated based on the virtual time computed by the virtual time computation section 120. More particularly, the object information is updated to move the object such as the sun or the like on a given path with the passage of the virtual time. This embodiment uses the sun as a light source used in the shading computation. Thus, the position of the sun corresponds to that of the light source. In such a case, it is assumed that the rays from the light source are parallel to one another since the sun is in a point at infinity. Thus, the incident angle of the parallel rays from the light source, that is, light source vector (light source angle) can be determined from the positional information of the sun. This information of light source vector is outputted toward the three-dimensional computation unit 210.

The details of the three-dimensional computation unit 210 will be described with reference to FIG. 11. The three-dimensional computation unit 210 comprises an image information storing section 212, a processing section 215, a coordinate transformation section 218, a vertex brightness computing section 219, a clipping section 220, a perspective-projective transformation section 222 and a sorting section 226.

The three-dimensional computation unit 210 performs various three-dimensional computations according to the setting information of the virtual three-dimensional space set by the virtual three-dimensional space computation unit 100.

Figure 15:
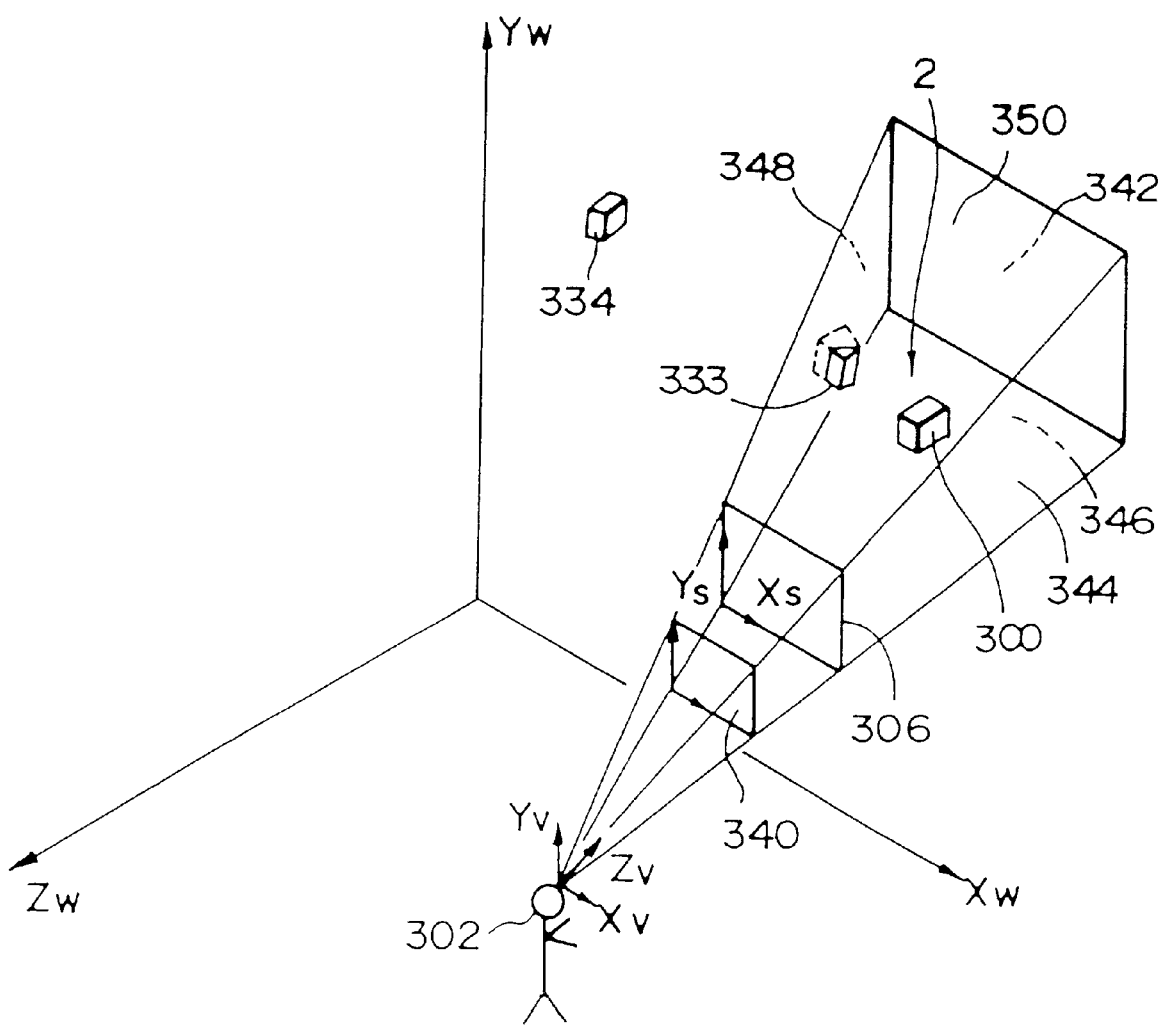
FIG. 15 is a view illustrating a three-dimensional computation.

As shown in FIG. 15, the image information of objects 300, 333 and 334 respectively presenting a game character, a building and a heavenly body are coordinate-transformed from a local coordinate system to a world coordinate system (XW, YW and ZW). The coordinate-transformed image information is further coordinate-transformed to a view coordinate system (Xv, Yv and Zv). These coordinate-transformations are performed by the coordinate transformation section 218. Thereafter, a so-called clipping is carried out by the clipping section 220. The perspective-projective transformation to a screen coordinate system (Xs and Ys) is then performed by the perspective-projective transformation section 222. Finally, the sorting may be carried out by the sorting section 226, if necessary.

In this embodiment, the object information including the positional information, direction information and object number is then transferred from the virtual three-dimensional space computation unit 100 to the processing section 215. The transferred object number is used as an address to read the image information of the corresponding object from the image information storing section 212. The image information storing section 212 stores the image information of the objects in the form of polygons.

Figure 16A:
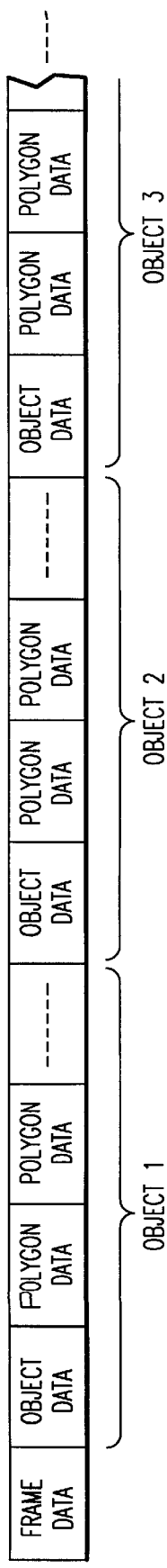
FIGS. 16A and 16B illustrate a data format.
Figure 16B:
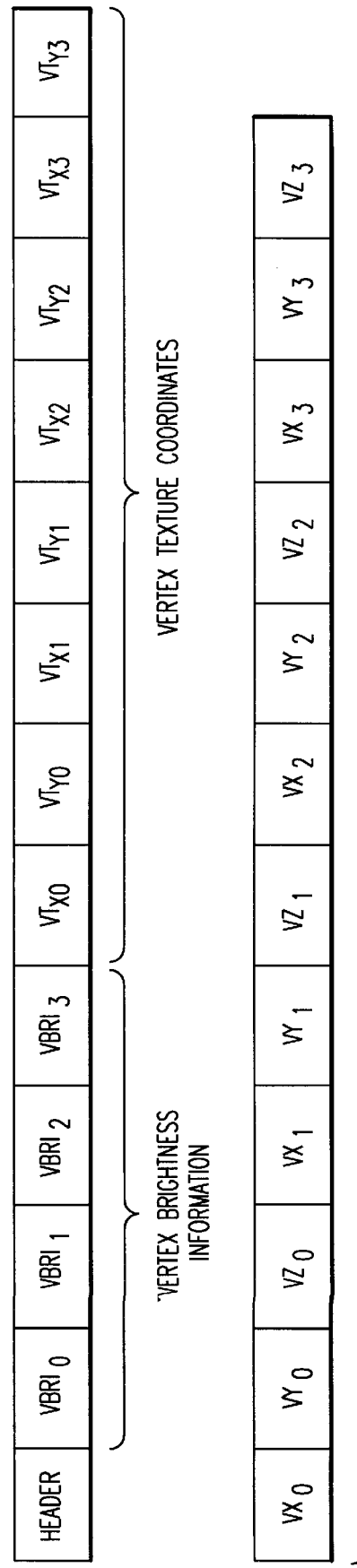

FIGS. 16A and 16B show a format of data to be processed by the three-dimensional computation unit 210. As shown in FIG. 16A, the data include frame data, object data and polygon data.

The frame data include data relating to view information, field angle, light source vector, light volume, light color, ambient light and others. The object data include positional object information, directional object information and other associated data. The polygon data are image information relating to polygons forming the objects, which include polygon vertex coordinates, vertex texture coordinates, vertex brightness information and other associated data, as shown in FIG. 16B. The vertex brightness information may be provided for each of the color components R, G and B.

The vertex brightness computation section 219 determines such vertex brightness information (brightness magnification) as shown in FIG. 16B and includes a shading computation section 213 and a depth-cueing computation section 214.

The shading computation section 213 performs the shading computation for the normal vector coordinate-transformed into the world coordinate system by the coordinate transformation section 218 (where vector is given to each vertex in a polygon), data of light source vector, light volume, light color, ambient light and others included in the frame data and an illumination model such as Lambert diffuse reflection model or specular reflection model.

When the Lambert diffuse reflection model is used to perform the shading computation, the following illumination model formula is used:

$$i = p_a + p_d \times d$$

where i is a light intensity; $p_a$ is an ambient (ambient light) component; and $p_d$ is a diffuse (diffuse reflection light) component. The coefficient d of the diffuse component may be presented by an inner product between the normal vector N and the light vector L as follows:

$$d = max(0, N \cdot L).$$

When the normal vector N, light vector L and other vectors are used in such a manner, the vertex brightness information (brightness magnification) can be determined. The shading computation may be carried out in any of various shading computations such as Gouraud shading and Phong shading.

Figure 17:
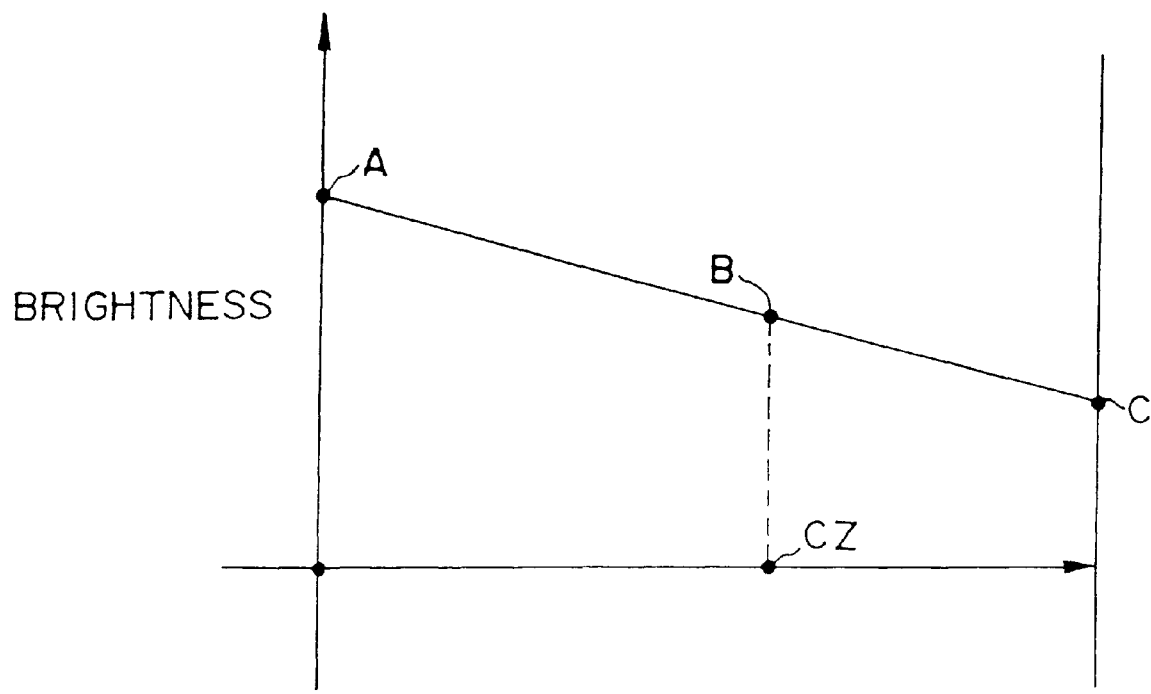
FIG. 17 is a view illustrating a depth-cueing computation.

The depth-cueing computation is carried out by the depth-cueing computation section 214 as follows. In FIG. 17, CZ is a depth information; A is an original brightness; C is a brightness to be determined by the brightness interpolation is in the depth-cueing computation; and B is a brightness at the depth CZ position that is determined by the depth-cueing computation. As the depth CZ is larger or deeper, the brightness B approaches the brightness C. When the brightness interpolation is carried out for each color component R, G and B, the depth-cueing computation can be accomplished. The depth-cueing computation section 214 may be included in the image forming section 228, instead of the three-dimensional computation unit 210. In such a case, the color interpolation may be made to specify the innermost color information (approaching color due to the depth-cueing computation) such that the depth information CZ approaches the innermost color information as the former increases.

The details of the image forming section 228 will now be described in connection with FIG. 12. The image forming section 228 determines the image information of each pixel in a polygon given by the three-dimensional computation unit 210 from the image information of each vertexes in that polygon, the determined image information being then outputted toward the display 10. The image forming section 228 comprises a drawing section 229, a texture information storing section 242, a translucent computation section 246 and a field buffer 248.

The drawing section 229 determines the drawn color in the interior of the polygon. The drawn color is determined by computing the brightness F in each of the color components R, G and B according to the following formula:

$$F = K \times T \times L$$

where K is a proportionality factor; T is the brightness in the original picture; and L is a brightness magnification. For example, if a polygon is painted with one color, the brightness T is constant within the polygon. If a polygon is to be subjected to a texture mapping, the brightness of each color component R, G and B in the original picture is stored in the texture information storing section 242. The brightness magnification L is obtained by the vertex brightness information computing section 219 as vertex brightness information. When a polygon is to be subjected to the shading or other computation, the brightness is compensated from the brightness magnification L according to the above formula.

The drawing data of polygons drawn by the drawing section 229 are sequentially written into the field buffer (VRAM or the like) 248. In this embodiment, the polygons are sequentially drawn starting from the polygon farthest from view-point. point Therefore, the drawing data of the polygons are sequentially written into the field buffer 248 starting from the polygon farthest from viewpoint. It is of course that any other technique such as Z-buffer technique may be used in the present invention or that the polygons are sequentially drawn starting from the outermost polygon.

The translucent computation carried out by the translucent computation section 246 will now be described. The translucent computation can be accomplished by determining the brightness P for each color component R, G and B according to the following formula:

$$P = K1 \times B + K2 \times F$$

where P is an actually drawn brightness; B is the brightness of the background; F is the brightness of the translucent object; and K1 and K2 are translucent factors. In this embodiment, the translucent factors K1 and K2 are adjusted depending on the amount of light in the light source. Thus, the heavenly bodies such as moon and others can be presented utilizing the translucent computation. For example, if the amount of light in the light source increases to brighten the sky, the factor K2 is reduced in the above formula (the other factor K1 may be increased). Thus, the moon can be presented as if it gradually disappears into the brightened sky. On the other hand, if the amount of light in the light source decreases to darken the sky, the factor K2 is increased in the above formula (the other factor K1 may be reduced). Thus, the moon can be presented as if it gradually appears in the darkened sky.

Figure 18:
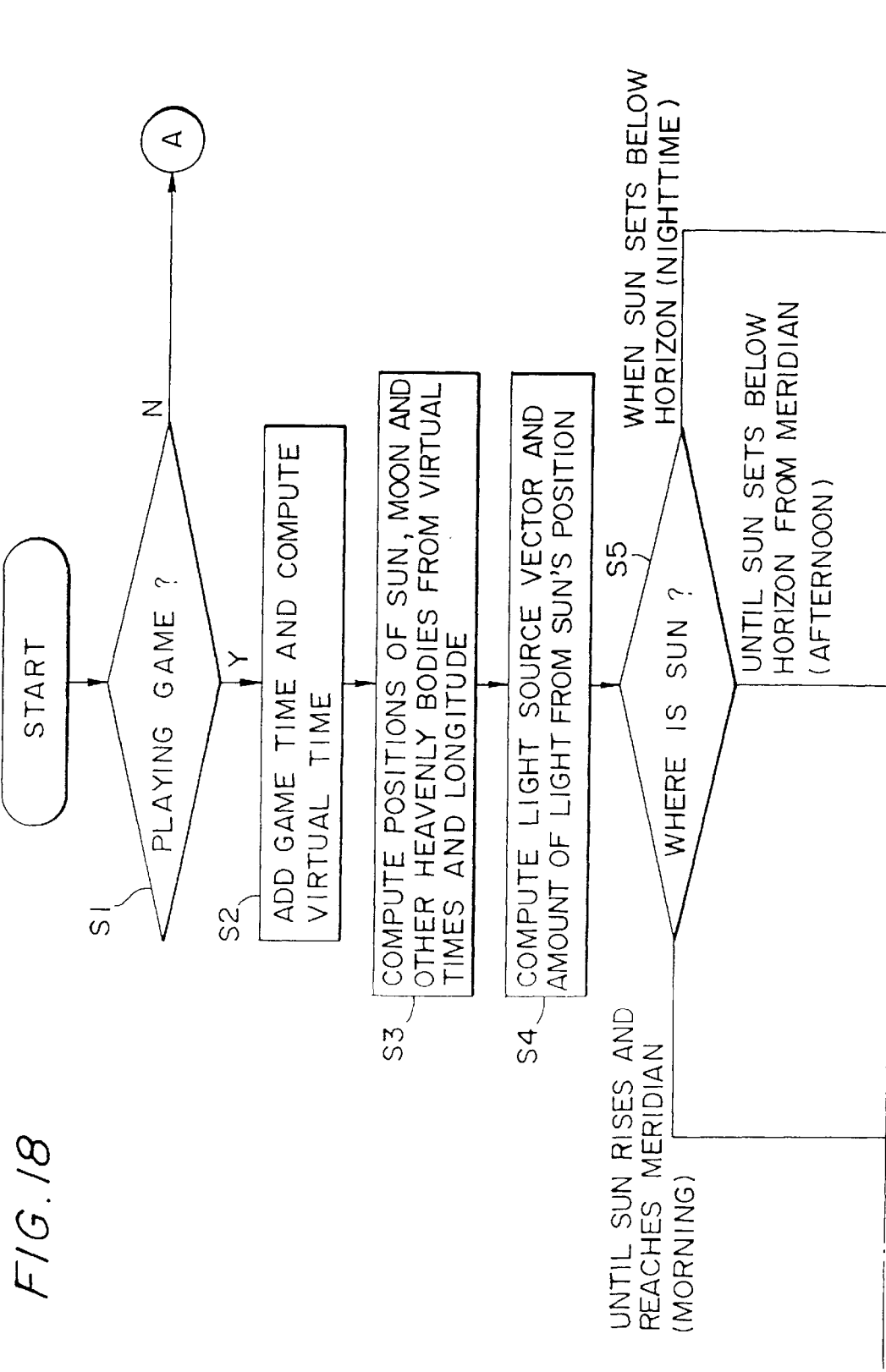
FIG. 18 is a flow chart illustrating the operation of the second embodiment.
Figure 18:
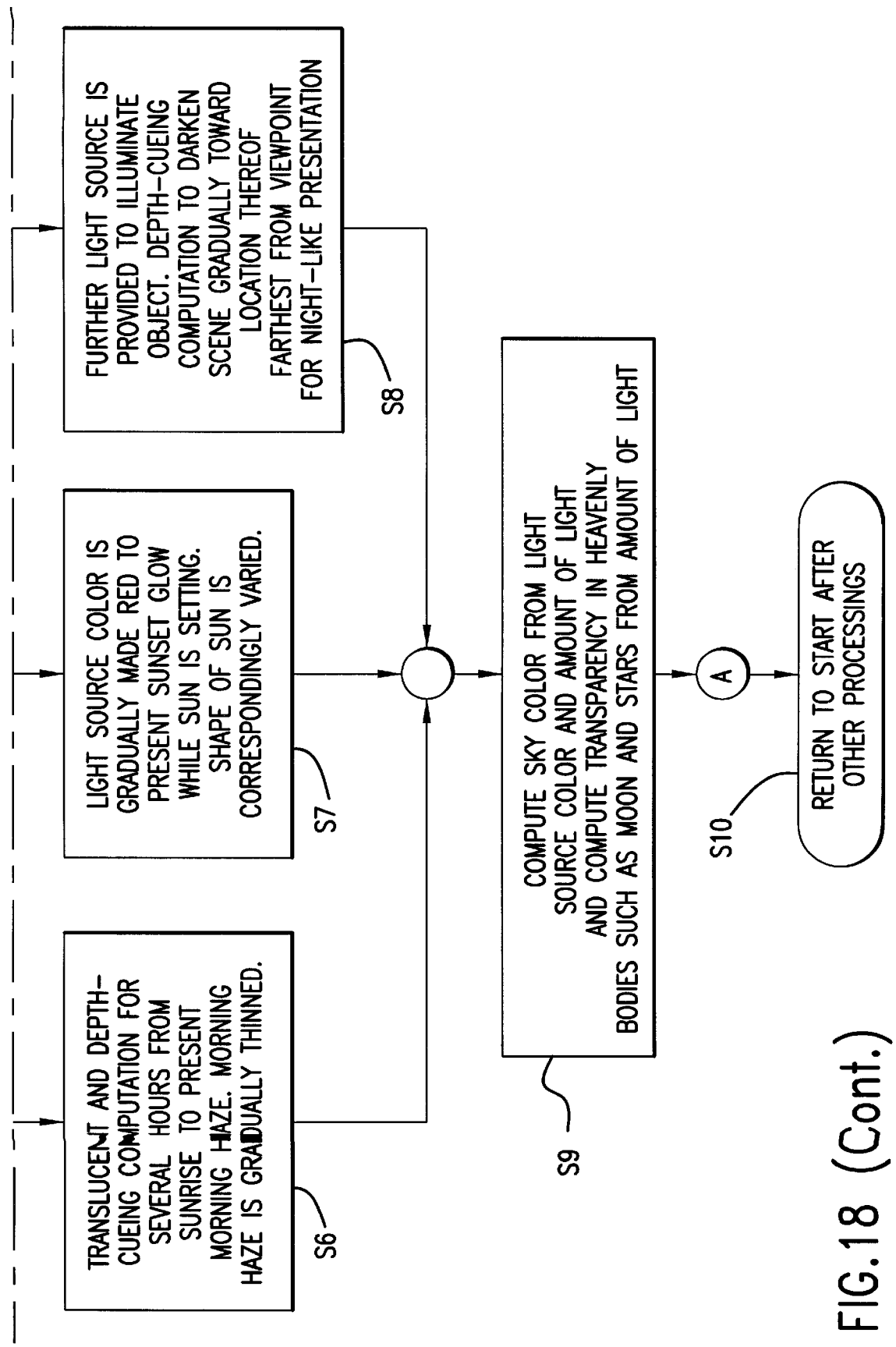

Finally, the operation of this embodiment will be described with reference to the flow chart in FIG. 18. It is first judged whether or not the game is being played (step S1). If the game is being played, the game time is counted to compute a virtual time (step S2). When the virtual time is to be counted even if no game is being played by a player, the step S1 is not required. In such a case, the virtual time will be continuously counted immediately after the game apparatus has been powered on.

The positional information of the heavenly bodies such as sun and moon is then determined from the virtual time and the positional information of the game stage such as altitude or the like (step S3). Thereafter, the light source vector and the amount of light in the light source are determined from the positional information of the sun (step S4). As described, the light source vector can be determined directly from the positional information of the sun. The amount of light is increased if the sun is in a high position, and reduced if the sun is in a low position.

It is then judged which position the sun is located in (step S5). Depending on the position of the sun, the program is shifted to any of steps S6, S7 and S8. If the sun is located between the horizon and the meridian (in the morning), the morning haze is presented for several hours from the sunrise through the translucent and depth-cueing computations (step S6 and FIG. 2B). In other words, a translucent polygon presenting the morning haze is displayed while the depth-cueing computation is performed to whiten the game scene gradually toward the location thereof farthest from view point. As the sun rises, such an effect is gradually thinned. If the sun is setting into the horizon from the meridian (in the afternoon), the color of the light source gradually becomes darker in red as the game scene approaches the sundown, thereby presenting the sunset. At the same time, the shape of the sun is correspondingly deformed (step S7, FIGS. 3B, 5A and 5B). If the sun is located below the horizon (in the night), a further light source is provided to illuminate the object while the depth-cueing computation is carried out to darken the game scene gradually toward the location thereof farthest from viewpoint (step S8 and FIG. 4).

As shown in step S9, the color of the sky is determined from the light source color and the amount of light. Thus, the evening sky is red and the night sky is black. Based on the amount of light in the light source or the like, the transparency in the heavenly bodies is computed to present the heavenly bodies such as the moon (FIGS. 6A and 6B). Thereafter, the program proceeds to step S10.

As shown in the step S5, this embodiment is characterized by that the subsequent processing steps are varied based on the position of the sun. More particularly, this embodiment judges which positional range the position of the sun belongs to among the plural positional ranges: the first range in which the sun is located between the horizon and the meridian, the second range in which the sun is setting into the horizon from the meridian and the third range in which the sun is located below the horizon. Each time when the positional range to which the position of the sun belongs is changed from one to another, the contents of the three-dimensional computation to be performed for the object are varied. If such plural positional ranges are omitted and the shading computation is performed truly depending on the positional information of the sun, a huge and complicated computation would be required and the real-time indispensable to the three-dimensional game apparatus would be lost. According to this embodiment, the process may be simplified since the morning haze is presented until the sun has risen to the meridian; the sunset is thereafter presented until the sun has set below the horizon; and the night darkness is presented when the sun is located (below the horizon. Therefore, the player can sense the passage of time while maintaining the real-time property in three-dimensional game apparatus.

The present invention is not limited to the aforementioned first and second embodiments, but it may be embodied in any other form.

For example, the passage of the virtual time described in the first and second embodiments is not necessarily required even when no game is played by the player. The virtual time may be counted only when the game is being played by the player. The virtual time may be computed according to the program and at the same time when the game apparatus is powered on. Alternatively, a time computing device having a calendar function may be provided to compute the virtual time based on the actual passage of time which is outputted from the time computing device.

The virtual time may be started at any time, for example, when the program is loaded, apart from when the game apparatus is powered on.

The shading, depth-cueing and translucent computations described in connection with the first and second embodiments may be replaced by any other computation techniques.

The present invention is not limited to the combatting game described in connection with the first and second embodiments, but may be applied to any other three-dimensional game apparatus such as racing car game, tank fighting game, battle plane fighting game, robot fighting game or the like.

Figure 19:
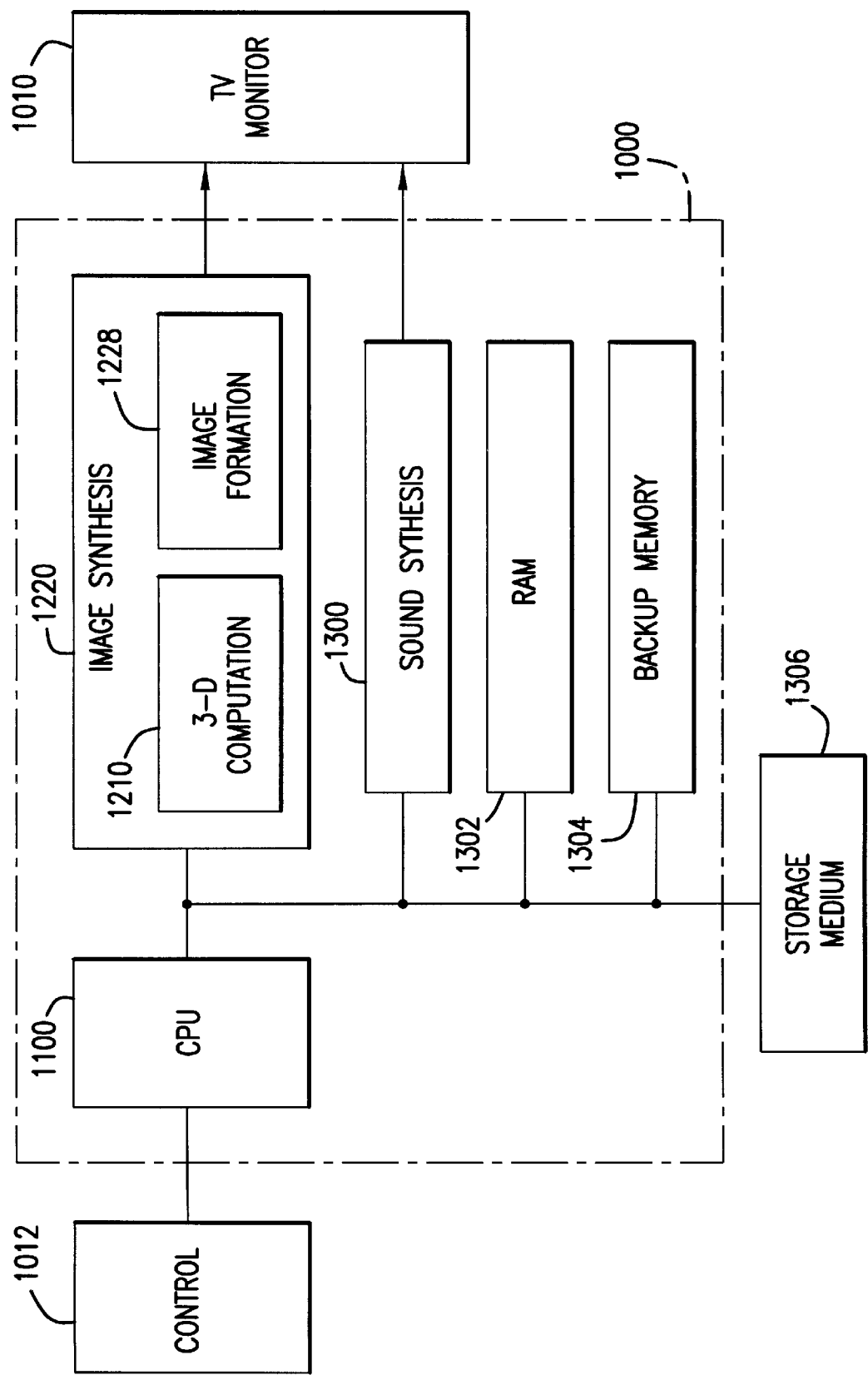
FIG. 19 is a block diagram of a home game machine to which the present invention is applied.
Figure 20A:
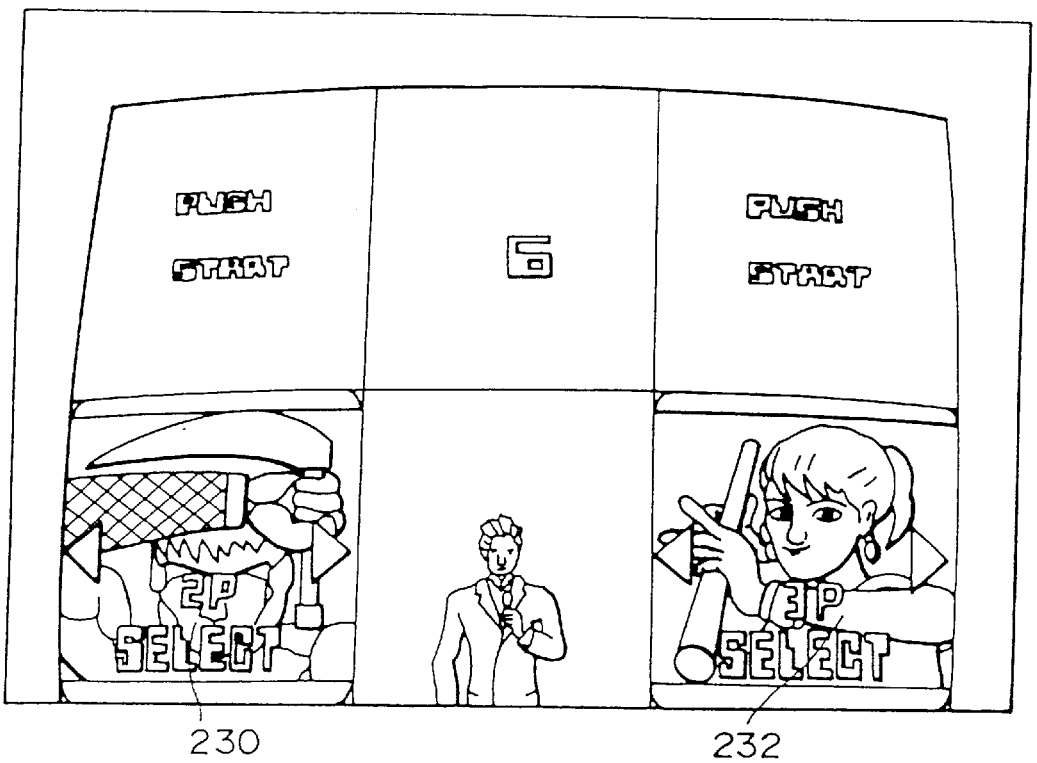
FIGS. 20A and 20B illustrate game scenes in a combat game.
Figure 20B:
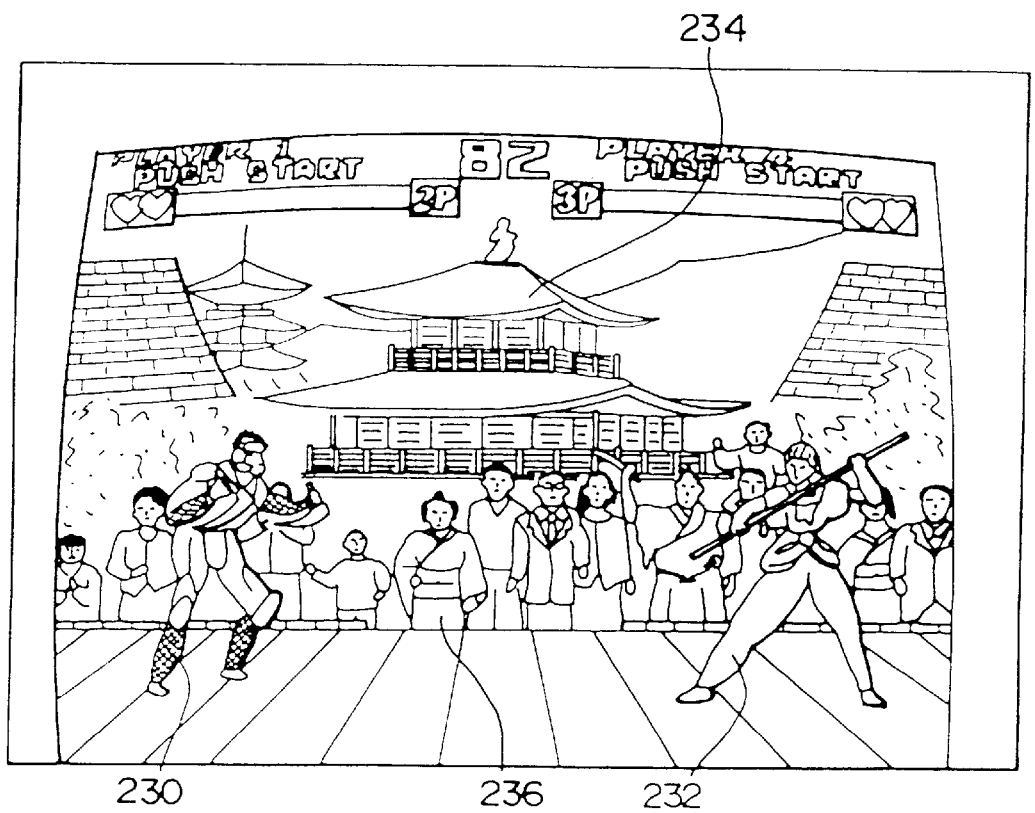

The present invention may be applied to a home game apparatus, besides the service three-dimensional game apparatus. FIG. 19 shows a block diagram of a home game apparatus to which the present invention is applied. The home game apparatus comprises a main device 1000, a controller 1012 and a storage medium 1306 such as CD-ROM, game cassette, memory card, MO disc. The created images and sounds are outputted toward a TV monitor 1010 or the like so that a player can enjoy in playing a game. The main device 1000 comprises a CPU 1100 having a virtual three-dimensional space computation unit, a three-dimensional computation unit 1210, an image synthesizing unit 1220 including an image forming section 1228, a sound synthesizing unit 1300, a working RAM 1302 and a backup memory (memory card or the like) 1304 for backing up the data. The computation of the passage of time may be performed only by a program (program codes) that has been stored in a storage medium 1306. Alternatively, a time computing device may be mounted and used in the game apparatus together with a program. If the storage medium 1306 is replaced by a new storage medium for performing another program, it is desirable that the virtual time in the old storage medium is saved and stored in the backup memory 1304. If the program is re-started, the game will be started at the saved virtual time.

The storage medium 1306 stores program codes for executing the computation of the virtual time, the computation of the positional object information, the three-dimensional computation and other computations. These program codes are then read out from the storage medium 1306 through the CPU 1100, image synthesizing unit 1220 and other units and executed so that various different processes described in connection with the first and second embodiments can be accomplished.

The present invention may be similarly applied to a so-called multimedia terminal or a big attraction type game apparatus in which a number of players play the game.

The computation executed in the virtual three-dimensional space computation unit, three-dimensional computation unit, image forming unit or other unit may be processed by the use of an exclusive image processing device or software-processed by utilizing a multi-purpose microcomputer, DSP or the like.

The structures of the virtual three-dimensional space computation unit, three-dimensional computation unit, image forming unit and other units as well as the computing techniques are not limited to those of the first and second embodiments.

The present invention may be similarly applied to a game apparatus in which synthesized game images are displayed on a display known as a head mount display (HMD).

What is claimed is:

1. A three dimensional game apparatus for synthesizing a field image from any view in a virtual three-dimensional space and displaying the synthesized field image, comprising:

virtual time computation means for determining a virtual time by computing a passage of time in said virtual three-dimensional space based on a passage of time in real space, means for computing at least positional information of an object disposed in said virtual three-dimensional space and positional information of a light source by using said virtual time, said light source moving in said virtual three-dimensional space with a passage of said virtual time, three-dimensional computation means for performing a three-dimensional computation including a shading computation on the object disposed in said virtual three-dimensional space by using the computed positional information of said light source, and display means for displaying the synthesized field image, wherein said three-dimensional computation means selects a positional range in which said light source is positioned from a plurality of positional ranges to which a plurality of three-dimensional computations are allocated, wherein said three-dimensional computation means selects a three-dimensional computation which is allocated to said selected positional range from said plurality of three-dimensional computations and performs said selected three-dimensional computation.

2. The three-dimensional game apparatus as defined in claim 1, wherein a color of at least one of an ambient light and the light source used for said three-dimensional computation is varied depending on a passage of said virtual time.

3. The three-dimensional game apparatus as defined in claim 1, further comprising depth-cueing computation means for performing a color interpolation to bring a color of a displayed object to a predetermined color, and wherein said depth-cueing computation means varies said predetermined color depending on a passage of said virtual time.

4. A three-dimensional game apparatus for synthesizing a field image from any view in a virtual three-dimensional space and displaying the synthesized field image, the three-dimensional game apparatus including game stages each having a different game setting and further comprising:

virtual time computation means for determining a virtual time by computing a passage of time in the virtual three-dimensional space based on a passage of time in real space, means for computing at least positional information of an object disposed in the virtual three-dimensional space, three-dimensional computation means for performing a three-dimensional computation, including a shading computation, on the object disposed in the virtual three-dimensional space by using said virtual time, display means for displaying the synthesized field image, and wherein said virtual time computation means computes a virtual time of one of said game stages when a game scene proceeds from a prior game stage to said one of the game stages, a starting point in computing the virtual time of said one of the game stages being a terminating point in computing a virtual time of said prior game stage.

5. A three-dimensional game apparatus for synthesizing a field image from any view in a virtual three-dimensional space and displaying the synthesized field image, the three-dimensional game apparatus including game stages each having a different game setting, and further comprising:

virtual time computation means for determining a virtual time by computing a passage of time in said virtual three-dimensional space based on a passage of time in real space, means for computing at least positional information of an object disposed in said virtual three-dimensional space, three-dimensional computation means for performing a three-dimensional computation including a shading computation on the object disposed in said virtual three-dimensional space by using said computed virtual time, display means for displaying the synthesized field image, and wherein said three-dimensional computation means varies the three dimensional computation performed on the object when one of said game stages moves to a next game stage with a proceeding of a game scene.

6. The three-dimensional game apparatus as defined in claim 5, wherein a path of a light source used by said three-dimensional computation changes with a movement of the game stages.

7. A three-dimensional game apparatus for synthesizing a field image from any view in a virtual three-dimensional space and displaying the synthesized field image, comprising:

virtual time computation means for determining a virtual time by computing a passage of time in said virtual three-dimensional space based on a passage of time in real space, means for computing at least positional information of an object disposed in said virtual three-dimensional space, three-dimensional computation means for performing a three-dimensional computation, including a shading computation, on the object disposed in said virtual three-dimensional space by using said computed virtual time, display means for displaying the synthesized field image, and wherein said virtual time computation means computes the passage of said virtual time when no player operates the game apparatus.

8. The three-dimensional game apparatus as defined in claim 7, wherein a demo scene is displayed when no player operates the game apparatus and the demo scene is varied depending on the passage of said virtual time.

9. A three dimensional game apparatus for synthesizing a field image from any view in a virtual three-dimensional space and displaying the synthesized field image, comprising:

virtual time computation means for determining a virtual time by computing a passage of time in said virtual three-dimensional space based on a passage of time in real space, means for computing at least positional information of an object disposed in said virtual three-dimensional space and positional information of a first light source by using said virtual time, said first light source moving in said virtual three-dimensional space with a passage of said virtual time, three-dimensional computation means for performing a three-dimensional computation including a shading computation on the object disposed in said virtual three-dimensional space by using the computed positional information of said first light source, and display means for displaying the synthesized field image, wherein a second light source is provided so that said three-dimensional computation is performed based on said second light source instead of said first light source when a particular game situation occurs as said virtual time passes, in said particular game situation a light from said first source missing said displayed object.

10. The three-dimensional game apparatus as defined in claim 9, wherein at least one of a position and type of said second light source is varied depending on a game stage.

11. A three-dimensional game apparatus for synthesizing a field image from any view in a virtual three-dimensional space and displaying the synthesized field image, comprising:

virtual time computation means for determining a virtual time by computing a passage of time in said virtual three-dimensional space based on a passage of time in real space, means for computing at least positional information of an object disposed in said virtual three-dimensional space and positional information of a light source by using said virtual time, said light source moving in said virtual three-dimensional space with a passage of said virtual time, three-dimensional computation means for performing a three-dimensional computation including a shading computation on the object disposed in said virtual three-dimensional space by using the computed positional information of said light source, display means for displaying the synthesized field image, and translucent computation means for drawing a translucent object by blending color information of a background with color information of the translucent object, wherein said translucent computation means reduces a blending ratio of the color information of the translucent object when an amount of light from a light source used in said three-dimensional computation increases with a passage of said virtual time and increases the blending ratio of said color information when said amount of light decreases.

12. An image synthesizing method for synthesizing a field image from any view in a virtual three-dimensional space and displaying the synthesized field image, comprising:

determining a virtual time by computing a passage of time in said virtual three-dimensional space based on a passage of time in real space, computing at least positional information of an object disposed in said virtual three-dimensional space and computing positional information of a light source by using said virtual time, said light source moving in said virtual three-dimensional space with a passage of said virtual time, performing a three-dimensional computation, including a shading computation, on the object disposed in said virtual three-dimensional space by using the computed positional information of said light source, displaying the synthesized field image, selecting a positional range in which said light source is positioned from a plurality of positional ranges to which a plurality of three-dimensional computations are allocated, selecting a three-dimensional computation which is allocated to said selected positional range from said plurality of three-dimensional computations, and performing said selected three-dimensional computation.

13. The image synthesizing method as defined in claim 12, wherein a color of at least one of an ambient light and the light source used for said three-dimensional computation is varied depending on a passage of said virtual time.

14. The image synthesizing method as defined in claim 12, further comprising a depth-cueing computation step for performing a color interpolation to bring a color of a displayed object to a predetermined color, and wherein said depth-cueing computation step varies said predetermined color depending on a passage of said virtual time.

15. An image synthesizing method for synthesizing a field image from any view in a virtual three-dimensional space, and displaying the synthesized field image and game stages each having a different game setting, comprising:

determining a virtual time by computing a passage of time in said virtual three-dimensional space based on a passage of time in real space, computing at least positional information of an object disposed in said virtual three-dimensional space, performing a three-dimensional computation, including a shading computation, on the object disposed in said virtual three-dimensional space by using said virtual time, displaying the synthesized field image, and wherein the determining step computes a virtual time of one of said game stages when a game scene proceeds from a prior game stage to said one of the game stages, a starting point in computing the virtual time of said one of the game stages being a terminating point in computing a virtual time of said prior game stage.

16. An image synthesizing method for synthesizing a field image from any view in a virtual three-dimensional space and displaying the synthesized field image and game stages each having a different game setting, comprising:

determining a virtual time by computing a passage of time in said virtual three-dimensional space based on a passage of time in real space, computing at least positional information of an object disposed in said virtual three-dimensional space, performing a three-dimensional computation, including a shading computation, on the object disposed in said virtual three-dimensional space by using said computed virtual time, displaying the synthesized field image, wherein the performing step varies the three-dimensional computation performed on the object when one of said game stages moves to a next game stage with a proceeding of a game scene.

17. A method of synthesizing a field image from any view in a virtual three-dimensional space and displaying the synthesized field image, comprising:

determining a virtual time by computing a passage of time in said virtual three-dimensional space based on a passage of time in real space, computing at least positional information of an object disposed in said virtual three-dimensional space, performing a three-dimensional computation, including a shading computation, including a shading computation, on the object disposed in said virtual three-dimensional space by using said computed virtual time, displaying the synthesized field image, wherein said determining step computes a passage of said virtual time even when no input is received from a player.

18. A storage medium read and/or written to by a computing device to synthesize a field image from any view in a virtual three-dimensional space and displaying the synthesized field image, comprising:

a virtual time data structure that includes instructions readable by said computing device to determine a virtual time by computing a passage of time in said virtual three-dimensional space based on a passage of time in real space, a position data structure that includes instructions readable by said computing device to compute at least positional information of an object disposed in said virtual three-dimensional space and positional information of a light source by using said virtual time, said light source moving in said virtual three-dimensional space with a passage of said virtual time, and a three-dimensional calculation data structure that includes instructions readable by said computing device to perform a three-dimensional computation, including a shading computation, on the object disposed in said virtual three-dimensional space by using the computed positional information of said light source, wherein said three-dimensional calculation data structure selects a positional range in which said light source is positioned from a plurality of positional ranges to which a plurality of three-dimensional computations are allocated, wherein said three-dimensional calculation data structure selects a three-dimensional computation which is allocated to said selected positional range from said plurality of three-dimensional computations and performs said selected three-dimensional computation.

19. The storage medium as defined in claim 18, wherein a color of at least one of an ambient light and the light source used for said three-dimensional computation is varied depending on a passage of said virtual time.

20. The storage medium as defined in claim 18, further comprising a depth-cueing computation data structure that includes instructions to perform a color interpolation to bring a color of a displayed object to a predetermined color, and wherein said instructions included in said depth-cueing computation data structure vary said predetermined color depending on a passage of said virtual time.

21. A storage medium read and/or written to by a computing device to synthesize a field image from any view in a virtual three-dimensional space, displaying the synthesized field image and displaying game stages each having a different game setting, comprising:

a virtual time data structure that includes instructions readable by said computing device to determine a virtual time by computing a passage of time in the virtual three-dimensional space based on a passage of time in real space, a position data structure that includes instructions readable by said computing device to compute at least positional information of an object disposed in the virtual three-dimensional space, a three-dimensional calculation data structure that includes instructions readable by said computing device to perform a three-dimensional computation, including a shading computation, on the object disposed in the virtual three-dimensional space by using said virtual time, wherein when a game scene proceeds from a prior game stage to one of the game stages, a starting point in computing a virtual time of said one of the game stages becomes a terminating point in computing a virtual time of said prior game stage.

22. A storage medium read and/or written to by a computing device to synthesize a field image from any view in a virtual three-dimensional space, displaying the synthesized field image and displaying game stages each of the game stages having a different game setting comprising:

a virtual time data structure that includes instructions readable by said computing device to determine a virtual time by computing a passage of time in said virtual three-dimensional space based on a passage of time in real space, a position data structure that includes instructions readable by said computing device to compute at least positional information of an object disposed in said virtual three-dimensional space, a three-dimensional computation data structure including instructions readable by said computing device to perform a three-dimensional computation, including a shading computation, on the object disposed in said virtual three-dimensional space by using said computed virtual time, wherein the three-dimensional computation performed on the object is varied when one of said game stages moves to a next game stage with a proceeding of a game scene.

23. A storage medium read and/or written to by a computing device to synthesize a field image from any view in a virtual three-dimensional space and displaying the synthesized field image, comprising:

a virtual time data structure that includes instructions readable by said computing device to determine a virtual time by computing a passage of time in said virtual three-dimensional space based on a passage of time in real space, a position data structure that includes instructions readable by said computing device to compute at least positional information of an object disposed in said virtual three-dimensional space, a three-dimensional computation data structure that includes instructions readable by said computing device to perform a three-dimensional computation, including a shading computation, on the object disposed in said virtual three-dimensional space by using said computed virtual time, wherein a passage of said virtual time is computed even when no input from a player is received.

24. An image synthesizing method for synthesizing a field image from any view in a virtual three-dimensional space and displaying the synthesized field image, comprising:

determining a virtual time computing a passage of time in said virtual three-dimensional space based on a passage of time in real space, computing at least positional information of an object disposed in said virtual three-dimensional space and computing positional information of a first light source by using said virtual time, said first light source moving in said virtual three-dimensional space with a passage of said virtual time, performing a three-dimensional computation, including a shading computation, on the object disposed in said virtual three-dimensional space by using the computed positional information of said first light source, and displaying the synthesized field image, wherein a second light source is provided so that said three-dimensional computation is performed based on said second light source instead of said first light source when a particular game situation occurs as said virtual time passes, in said particular game situation a light from said first light source missing said displayed object.

25. The image synthesizing method as defined in claim 24, wherein at least one of a position and type of said second light source is varied depending on a game stage.

26. An image synthesizing method for synthesizing a field image from any view in a virtual three-dimensional space and displaying the synthesized field image, comprising:

determining a virtual time computing a passage of time in said virtual three-dimensional space based on a passage of time in real space, computing at least positional information of an object disposed in said virtual three-dimensional space and computing positional information of a light source by using said virtual time, said light source moving in said virtual three-dimensional space with a passage of said virtual time, performing a three-dimensional computation, including a shading computation, on the object disposed in said virtual three-dimensional space by using the computed positional information of said light source, displaying the synthesized field image, and drawing a translucent object by blending color information of a background with color information of the translucent object, and wherein a blending ratio of the color information of the translucent object is reduced when an amount of light from a light source used in said three-dimensional computation increases with a passage of said virtual time and the blending ratio of said color information is increased when said amount of light decreases.

27. A storage medium read and/or written to by a computing device to synthesize a field image from any view in a virtual three-dimensional space and displaying the synthesized field image, comprising:

a virtual time data structure that includes instructions readable by said computing device to determine a virtual time by computing a passage of time in said virtual three-dimensional space based on a passage of time in real space, a position data structure that includes instructions readable by said computing device to compute at least positional information of an object disposed in said virtual three-dimensional space and positional information of a first light source by using said virtual time, said first light source moving in said virtual three-dimensional space with a passage of said virtual time, and a three-dimensional calculation data structure that includes instructions readable by said computing device to perform a three-dimensional computation, including a shading computation, on the object disposed in said virtual three-dimensional space by using the computed positional information of said first light source, wherein a second light source is provided so that said three-dimensional computation is performed based on said second light source instead of said first light source when a particular game situation occurs as said virtual time passes, in said particular game situation a light from said first light source missing said displayed object.

28. The storage medium image as defined in claim 27, wherein at least one of a position and type of said second light source is varied depending on a game stage.

29. A storage medium read and/or written to by a computing device to synthesize a field image from any view in a virtual three-dimensional space and displaying the synthesized field image, comprising:

a virtual time data structure that includes instructions readable by said computing device to determine a virtual time by computing a passage of time in said virtual three-dimensional space based on a passage of time in real space, a position data structure that includes instructions readable by said computing device to compute at least positional information of an object disposed in said virtual three-dimensional space and positional information of a light source by using said virtual time, said light source moving in said virtual three-dimensional space with a passage of said virtual time, and a three-dimensional calculation data structure that includes instructions readable by said computing device to perform a three-dimensional computation, including a shading computation, on the object disposed in said virtual three-dimensional space by using the computed positional information of said light source, a translucent computation data structure that includes instructions to draw a translucent object by blending color information of a background with color information of the translucent object, and wherein said instructions included in said translucent computation data structure reduce a blending ratio of the color information of the translucent object when an amount of light from a light source used in said three-dimensional computation increases with a passage of said virtual time and increases the blending ratio of said color information when said amount of light decreases.

* * * * *